United States Patent
Shima et al.

(10) Patent No.: US 11,755,318 B2
(45) Date of Patent: Sep. 12, 2023

(54) PROPOSING DEVICE AND IMPROVEMENT PROPOSING METHOD

(71) Applicant: Mitsubishi Electric Corporation, Tokyo (JP)

(72) Inventors: Daiki Shima, Tokyo (JP); Toshiki Kitajima, Tokyo (JP); Toshihiro Kobayashi, Tokyo (JP); Yuki Hikawa, Tokyo (JP); Taishi Azuma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 31 days.

(21) Appl. No.: 17/634,571

(22) PCT Filed: Jul. 2, 2020

(86) PCT No.: PCT/JP2020/025938
§ 371 (c)(1),
(2) Date: Feb. 11, 2022

(87) PCT Pub. No.: WO2021/039110
PCT Pub. Date: Mar. 4, 2021

(65) Prior Publication Data
US 2022/0269502 A1    Aug. 25, 2022

(30) Foreign Application Priority Data

Aug. 28, 2019 (JP) .................................. 2019-155420
Dec. 16, 2019 (JP) .................................. 2019-226379

(51) Int. Cl.
*G06F 8/72* (2018.01)
(52) U.S. Cl.
CPC ..................................... *G06F 8/72* (2013.01)

(58) Field of Classification Search
CPC ..................................... G06F 8/72; G06F 8/75
See application file for complete search history.

(56) References Cited

U.S. PATENT DOCUMENTS

| | | | |
|---|---|---|---|
| 2009/0055142 A1 | 2/2009 | Nitta et al. | |
| 2010/0217759 A1* | 8/2010 | Ma | G06F 16/2282 707/719 |

(Continued)

FOREIGN PATENT DOCUMENTS

| | | |
|---|---|---|
| JP | 2009048287 A | 3/2009 |
| JP | 2013030036 A | 2/2013 |

(Continued)

OTHER PUBLICATIONS

Martini et al., "Estimating and Quantifying the Benefits of Refactoring to Improve a Component Modularity: a Case Study" (Year: 2016).*

(Continued)

*Primary Examiner* — Phillip H Nguyen
(74) *Attorney, Agent, or Firm* — BUCHANAN INGERSOLL & ROONEY PC

(57) ABSTRACT

Even when one refactoring operation cannot establish a target software structure, an appropriate refactoring operation establishes the target software structure. An improvement proposing device includes: a structure comparator to output, as an improvement object, a difference between a first software structure and a second software structure different in software structure from the first software structure; and an improvement plan examining unit to examine an improvement plan for each improvement portion in the improvement object, the improvement plan being a method for bringing the first software structure closer to the second software structure.

15 Claims, 32 Drawing Sheets

(56) References Cited

U.S. PATENT DOCUMENTS

| | | | |
|---|---|---|---|
| 2016/0019609 A1* | 1/2016 | Miyazaki | G06F 8/751 |
| | | | 705/400 |
| 2016/0054994 A1* | 2/2016 | Sakamoto | G06F 16/22 |
| | | | 717/120 |
| 2017/0235569 A1* | 8/2017 | Sturtevant | G06Q 10/06393 |
| | | | 717/102 |
| 2021/0173638 A1* | 6/2021 | Jia | G06F 8/33 |
| 2021/0326130 A1 | 10/2021 | Fujii et al. | |

FOREIGN PATENT DOCUMENTS

| | | |
|---|---|---|
| JP | 2014026389 A | 2/2014 |
| JP | 2016177668 A | 10/2016 |
| JP | 2018041262 A | 3/2018 |
| JP | 2019101830 A | 6/2019 |
| WO | 2018150505 A1 | 8/2018 |

OTHER PUBLICATIONS

International Search Report (PCT/ISA/210) with translation and Written Opinion (PCT/ISA/237) dated Oct. 6, 2020, by the Japan Patent Office as the International Searching Authority for International Application No. PCT/JP2020/025938. (12 pages).

Komatsuda, Takuya, et al., "Supporting Prefactoring Using Feature Location Results", IEICE Technical Report, 2014, pp. 109-114, vol. 114, No. 128. (6 pages).

Lin, Y., et al., "Interactive and Guided Architectural Refactoring with Search-Based Recommendation", in Proceedings of the 2016 24th ACM SIGSOFT Intl Symposium on Foundations of Software Engineering, Nov. 2016, pp. 535-546. (12 pages).

Yakado, Akito, et al., "Prototype of Automatic Refactoring Tool Using Automatic Program Modification Method", IEICE Technical Report, pp. 7-12, vol. 118, No. 138, Section 2.3 jGenProg, partial translation. (6 pages).

* cited by examiner

F I G. 1
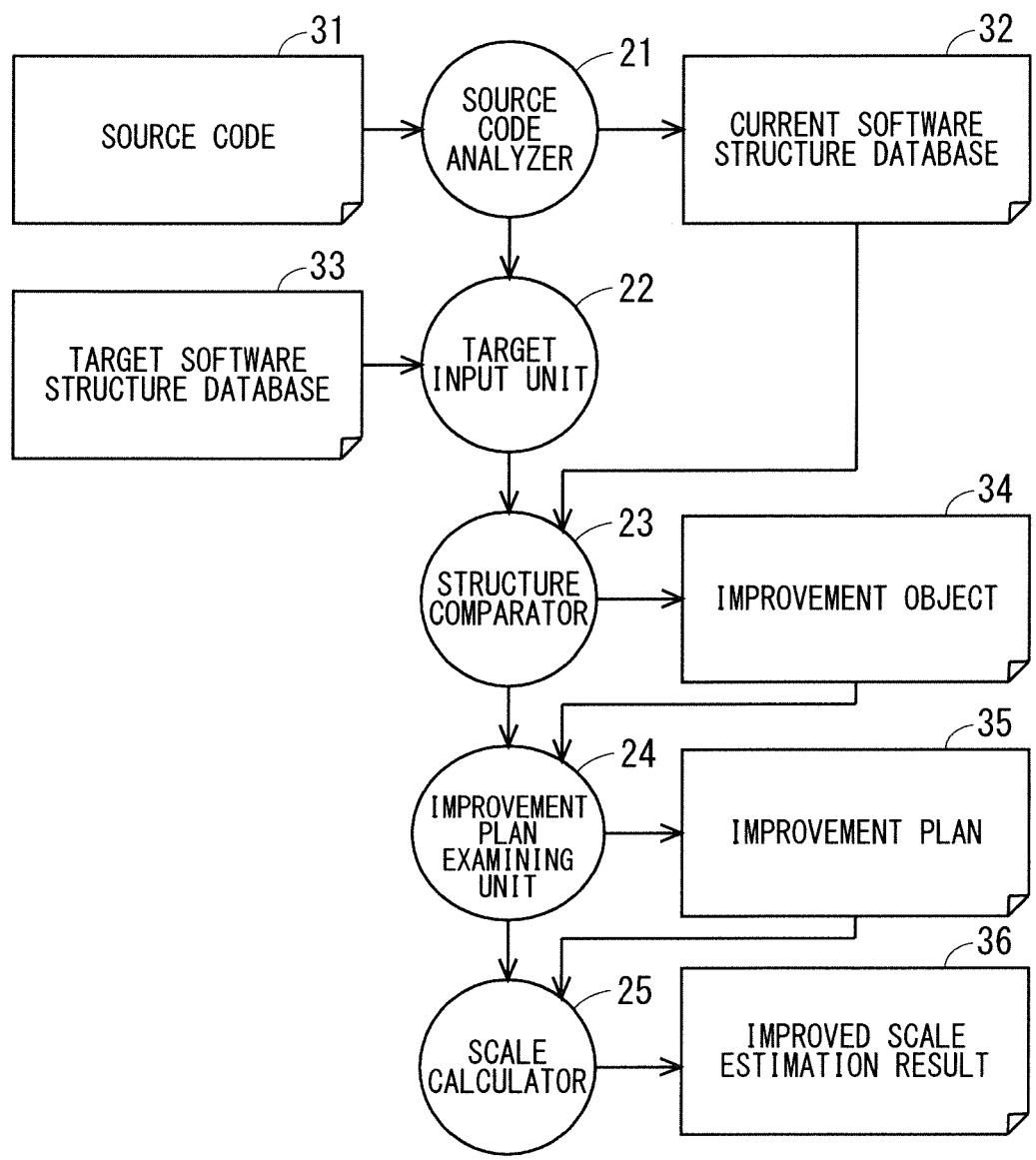

F I G. 2
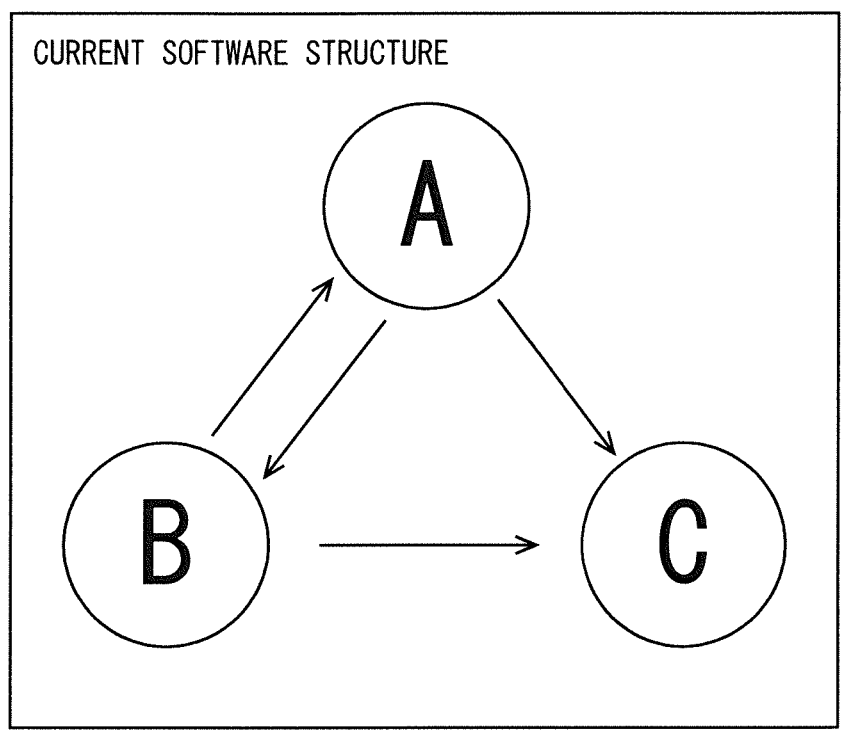

F I G. 3

| SOFTWARE COMPONENT OF DEPENDENCY SOURCE | SOFTWARE COMPONENT OF DEPENDENCY DESTINATION | DEPENDENCY TYPE | DEPENDENCY STRENGTH |
|---|---|---|---|
| File_B/Func_B() | File_A/Val_A | REFERENCING GLOBAL VARIABLE | 3 |
| File_B/Func_B() | File_C/Func_C() | FUNCTION CALL | 2 |
| File_A/Func_A() | File_B/Func_B() | FUNCTION CALL | 2 |
| File_A/Func_A() | File_C/Func_C() | FUNCTION CALL | 2 |

F I G. 5

| SOFTWARE COMPONENT OF DEPENDENCY SOURCE | SOFTWARE COMPONENT OF DEPENDENCY DESTINATION | DEPENDENCY TYPE | DEPENDENCY STRENGTH |
|---|---|---|---|
| File_A/Func_A() | File_B/Func_B() | FUNCTION CALL | 2 |
| File_A/Func_A() | File_C/Func_C() | FUNCTION CALL | 2 |

F I G. 6

| IMPROVEMENT PLAN | DEPENDENCY TYPE | DEPENDENCY STRENGTH |
|---|---|---|
| DELETE B TO A | REFERENCING GLOBAL VARIABLE | 3 |
| DELETE B TO C | FUNCTION CALL | 2 |

FIG. 7

| IMPROVEMENT PLAN | MAN HOUR[hr] |
|---|---|
| DELETE B TO A | 30 |
| DELETE B TO C | 10 |

F I G. 9
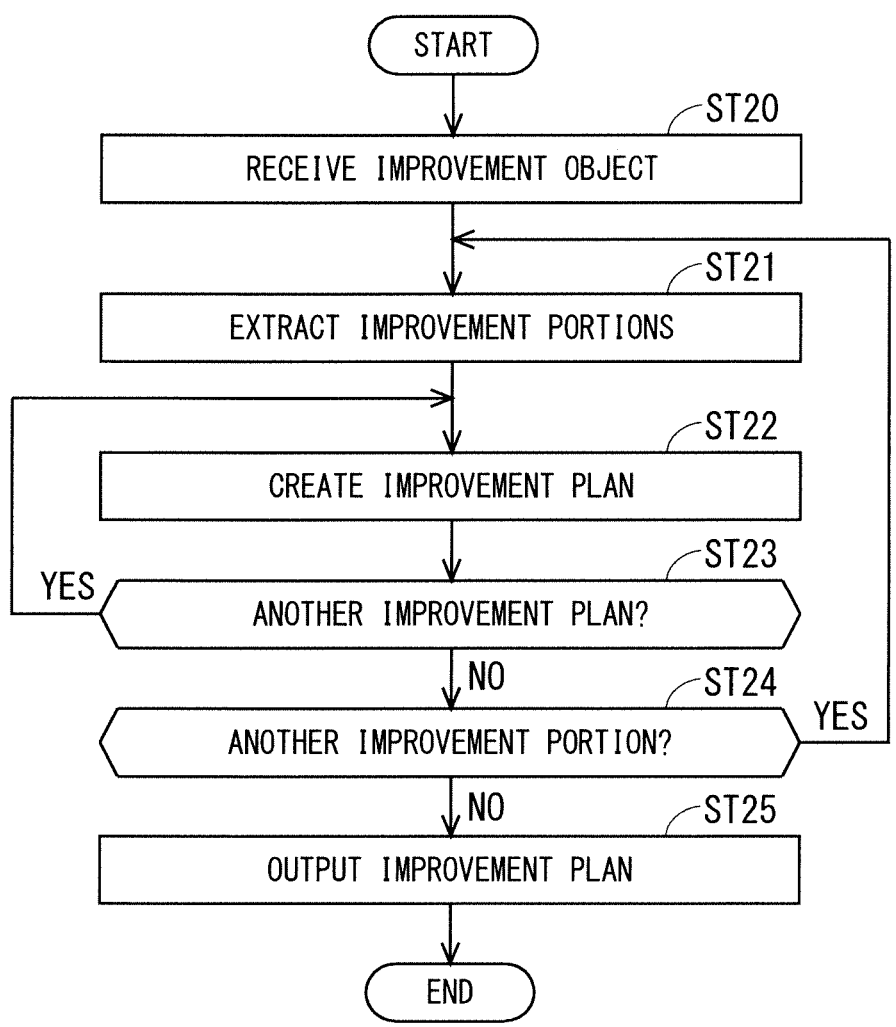

F I G. 1 0

| IMPROVEMENT PORTION | DEPENDENCY TYPE | DEPENDENCY STRENGTH | IMPROVEMENT PLAN |
|---|---|---|---|
| B→A | REFERENCING GLOBAL VARIABLE | 3 | DELETE |
| B→A | REFERENCING GLOBAL VARIABLE | 3 | TRANSFER |
| B→C | FUNCTION CALL | 2 | DELETE |
| B→C | FUNCTION CALL | 2 | TRANSFER |

F I G. 1 7

| No. | IMPLEMENTATION PLAN |
|---|---|
| 1 | CHANGE B TO C (EXISTING FUNCTION) TO A |
| 2 | CHANGE B TO D (NEW FUNCTION) TO A |
| 3 | MOVE B CALLING A TO A |
| 4 | COMBINE B AND A |

FIG. 20

| IMPROVEMENT PLAN | | IMPROVEMENT PLAN A | | | | IMPROVEMENT PLAN B | | |
|---|---|---|---|---|---|---|---|---|
| | | IMPLEMENTATION PLAN A1 | IMPLEMENTATION PLAN A2 | IMPLEMENTATION PLAN A3 | IMPLEMENTATION PLAN A4 | IMPLEMENTATION PLAN B1 | IMPLEMENTATION PLAN B2 | IMPLEMENTATION PLAN B3 |
| IMPROVEMENT PLAN A | IMPLEMENTATION PLAN A1 | | | | | × | | |
| | IMPLEMENTATION PLAN A2 | | | | | | | |
| | IMPLEMENTATION PLAN A3 | | | | | | × | |
| | IMPLEMENTATION PLAN A4 | | | | | | | |
| IMPROVEMENT PLAN B | IMPLEMENTATION PLAN B1 | × | | | | | | |
| | IMPLEMENTATION PLAN B2 | | | × | | | | |
| | IMPLEMENTATION PLAN B3 | | | | | | | |

F I G. 2 7
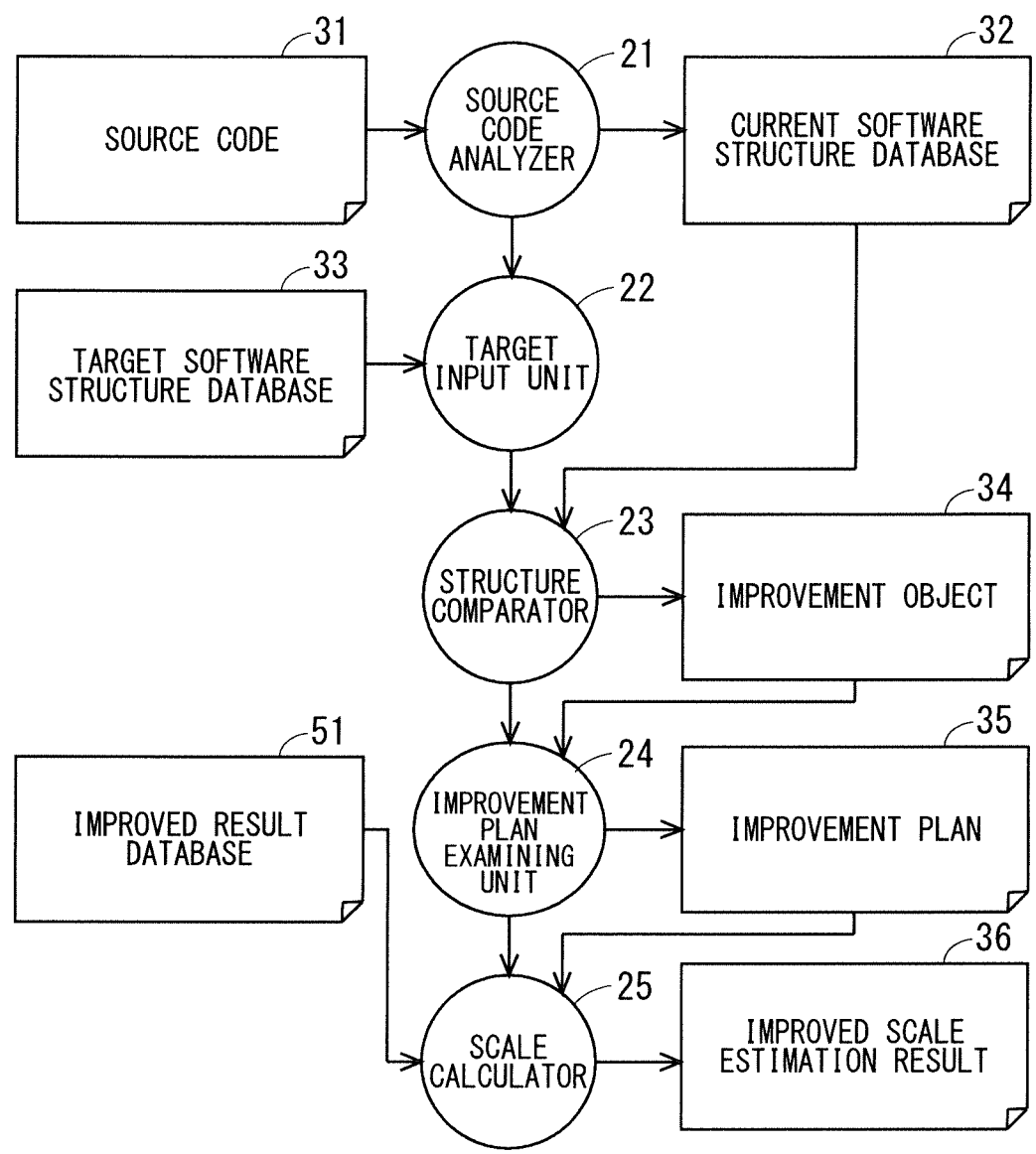

FIG. 28

| IMPROVEMENT ID | IMPROVEMENT PLAN | DEPENDENCY TYPE | DEPENDENCY STRENGTH | PROPOSED MAN HOUR [hr] | RESULT MAN HOUR [hr] |
|---|---|---|---|---|---|
| 1 | DELETE B TO A | REFERENCING GLOBAL VARIABLE | 3 | 30 | 25 |
| 2 | DELETE B TO C | FUNCTION CALL | 2 | 10 | 15 |

F I G. 3 1
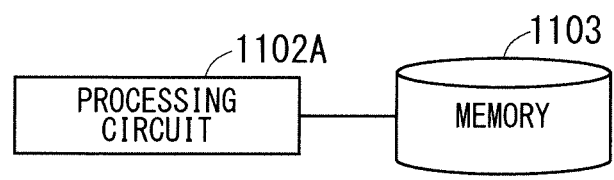

PROPOSING DEVICE AND IMPROVEMENT PROPOSING METHOD

TECHNICAL FIELD

The technology disclosed in this DESCRIPTION relates to an improvement proposing device and an improvement proposing method on software refactoring.

BACKGROUND ART

Repeated use of a source code sometimes unintentionally leads to a software structure with a different design.

Restructuring the source code into a software structure that accommodates the design intent (or a new software structure) is typically addressed by refactoring that improves a software structure that obstructs the design intent (see, for example, Patent Document 1).

PRIOR ART DOCUMENT

Patent Document

Patent Document 1: WO2018/150505

SUMMARY

Problem to be Solved by the Invention

In Patent Document 1, the scale of one refactoring is estimated using dependency strength. However, one refactoring operation sometimes cannot establish a target software structure. Patent Document 1 fails to consider such a case.

The technology disclosed in this DESCRIPTION has been conceived in view of the aforementioned problem. The object is to provide a technology for establishing a target software structure by performing an appropriate refactoring operation even when one refactoring operation cannot establish the target software structure.

Means to Solve the Problem

The first aspect of the technology disclosed in this DESCRIPTION includes: a source code analyzer to analyze a first software structure in a source code; a target input unit to input a second software structure different in software structure from the first software structure; a structure comparator to output, as at least one improvement object, a difference between the first software structure and the second software structure; and an improvement plan examining unit to examine an improvement plan for each improvement portion in the at least one improvement object, the improvement plan being a method for bringing the first software structure closer to the second software structure.

The second aspect of the technology disclosed in this DESCRIPTION includes: analyzing a first software structure in a source code; outputting, as an improvement object, a difference between the first software structure and a second software structure different in software structure from the first software structure; and examining an improvement plan for each improvement portion in the improvement object, the improvement plan being a method for bringing the first software structure closer to the second software structure.

Effects of the Invention

Even when one refactoring operation cannot establish a target software structure, examination of an improvement plan for each improvement portion that is a part of an improvement object that is a difference between a current software structure and the target software structure enables selection and refactoring each of the improvement plans according to the first aspect of the technology disclosed in this DESCRIPTION. Thus, even when one refactoring operation cannot establish the target software structure, the improvement plans can be refactored stepwise.

Even when one refactoring operation cannot establish a target software structure, examination of an improvement plan for each improvement portion that is a part of an improvement object that is a difference between a current software structure and the target software structure enables refactoring the improvement plans stepwise according to the second aspect of the technology disclosed in this DESCRIPTION.

The object, features, aspects and advantages related to the technology disclosed in the DESCRIPTION will become more apparent from the following detailed description and the accompanying drawings.

BRIEF DESCRIPTION OF DRAWINGS

FIG. 1 conceptually illustrates an example configuration of an improvement proposing device according to an embodiment.

FIG. 2 illustrates an example current software structure.

FIG. 3 illustrates an example current software structure database.

FIG. 5 illustrates an example target software structure database.

FIG. 6 illustrates example improvement plans.

FIG. 7 illustrates example improved scale estimation results, using the improvement plans in FIG. 6 as input.

FIG. 9 is a flowchart for outputting an improvement plan on one improvement portion in a plurality of patterns.

FIG. 10 illustrates an example where an improvement plan on one improvement portion is extracted in a plurality of patterns.

FIG. 17 illustrates example implementation plans.

FIG. 20 illustrates an example improvement plan combination table.

FIG. 27 conceptually illustrates an example configuration of an improvement proposing device according to an embodiment.

FIG. 28 illustrates an example improved result database.

FIG. 31 schematically exemplifies hardware configurations when the improvement proposing device exemplified in, for example, FIG. 1 is actually operated.

FIG. 1 is actually operated.

DESCRIPTION OF EMBODIMENTS

Figure 4:
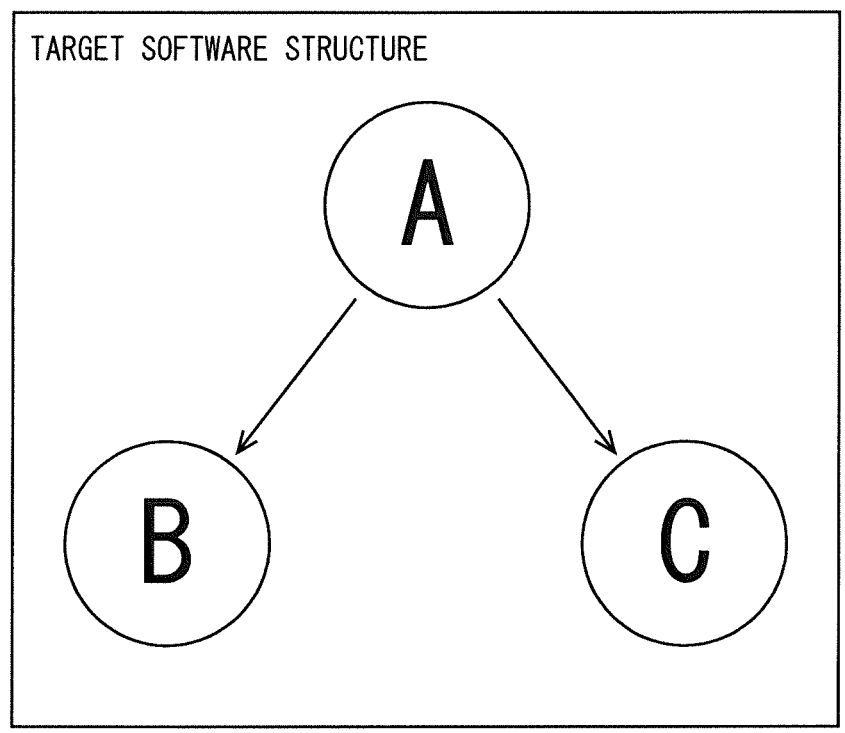
FIG. 4 illustrates an example target software structure.

Hereinafter, Embodiments will be described with reference to the accompanying drawings. Although detailed features are described in Embodiments below for description of the technology, they are mere exemplification and not necessarily essential features for making Embodiments feasible.

Note that the drawings are drawn in schematic form, and the configurations are appropriately omitted or simplified for convenience of the description. The mutual relationships in size and position between the configurations in the different drawings are not necessarily accurate but may be appropriately changed. The drawings such as plan views except cross-sectional views are sometimes hatched for facilitating the understanding of the details of Embodiments.

In the following description, the same reference numerals are assigned to the same constituent elements, and their names and functions are the same. Therefore, detailed description of such constituent elements may be omitted to avoid redundant description.

Unless otherwise specified, an expression "comprising", "including", or "having" a certain constituent element is not an exclusive expression for excluding the presence of the other constituent elements in the following description.

Even when the ordinal numbers such as "first" and "second" are used in the following description, these terms are used for convenience to facilitate the understanding of the details of Embodiments. The order indicated by these ordinal numbers does not restrict the details of Embodiments.

Embodiment 1

An improvement proposing device and an improvement proposing method according to Embodiment 1 will be hereinafter described.

[Configuration of Improvement Proposing Device]

FIG. 1 conceptually illustrates an example configuration of the improvement proposing device according to Embodiment 1. As illustrated in the example of FIG. 1, the improvement proposing device includes a source code analyzer 21, a target input unit 22, a structure comparator 23, an improvement plan examining unit 24, and a scale calculator 25.

The input of the target input unit 22 is connected to the output of the source code analyzer 21. The input of the structure comparator 23 is connected to the output of the target input unit 22.

The input of the improvement plan examining unit 24 is connected to the output of the structure comparator 23. The input of the scale calculator 25 is connected to the output of the improvement plan examining unit 24.

The source code analyzer 21 receives a source code 31 as input. The source code analyzer 21 analyzes a current software structure in the received source code 31 to extract the current software structure. Then, the source code analyzer 21 outputs a current software structure database 32 including the extracted current software structure.

Software components described in the source code 31 are extracted from the current software structure database 32. Examples of the software components include a function, a variable, a global variable, a file, and a macro.

Furthermore, a dependency type and dependency strength between the software components are extracted from the current software structure database 32. Examples of the dependency type between the software components include inclusion, macro and function calls, writing to a variable, and referencing a global variable. Furthermore, examples of the dependency strength between the software components include the number of times the components in the same software depend on each other.

FIG. 2 illustrates an example current software structure. As illustrated in the example of FIG. 2, the current software structure includes files A to C. In this example, A to C denote the files in the software structure.

Furthermore, arrows each indicate dependency. A start point of the arrow indicates a dependency source, and an end point of the arrow indicates a dependency destination. In the example of FIG. 2, A is a dependency source of B, a dependency destination of B, and a dependency source of C. Furthermore, B is a dependency source of A, a dependency destination of A, and a dependency source of C. Furthermore, C is a dependency destination of each of A and B.

FIG. 3 illustrates an example current software structure database. In the current software structure database, components on the dependency, the dependency type, and information on the dependency strength are stored for each row.

The software component of the dependency destination of a function File_B/Func_B( ) is a variable File_A/Val_A, the dependency type is referencing a global variable, and the dependency strength is 3.

The software component of the dependency destination of the function File_B/Func_B( ) is a function File_C/Func_C( ), the dependency type is a function call, and the dependency strength is 2.

The software component of the dependency destination of a function File_A/Func_A( ) is the function File_B/Func_B( ), the dependency type is a function call, and the dependency strength is 2.

The software component of the dependency destination of the function File_A/Func_A( ) is the function File_C/Func_C( ), the dependency type is a function call, and the dependency strength is 2.

The target input unit 22 in FIG. 1 receives a target software structure database 33 as input.

FIG. 4 illustrates an example target software structure. As illustrated in the example of FIG. 4, the target software structure includes files A to C. In this example, A to C denote the files in the software structure.

Furthermore, arrows each indicate dependency. A start point of the arrow indicates a dependency source, and an end point of the arrow indicates a dependency destination. In the example of FIG. 4, A is a dependency source of each of B and C. Furthermore, B is a dependency destination of A. Furthermore, C is a dependency destination of A.

FIG. 5 illustrates an example target software structure database.

The software component of the dependency destination of the function File_A/Func_A( ) is the function File_B/Func_B( ), the dependency type is a function call, and the dependency strength is 2.

The software component of the dependency destination of the function File_A/Func_A( ) is the function File_C/Func_C( ), the dependency type is a function call, and the dependency strength is 2.

The structure comparator 23 in FIG. 1 receives the current software structure database 32 and the target software structure database 33 as input. Then, the structure comparator 23 compares the current software structure database 32 with the target software structure database 33, and outputs the difference as an improvement object 34. Here, the structure comparator 23 compares dependencies of the software components.

Examples of the improvement object 34 that is the difference include the arrow extending from B to A and the arrow extending from B to C in the examples illustrated in FIGS. 2 and 4.

The improvement plan examining unit 24 in FIG. 1 receives the improvement object 34 as input. Then, the improvement plan examining unit 24 identifies a method (e.g., transfer of a program component or function decomposition) for improving the current software structure database 32 into the target software structure database 33 using the improvement object 34 as input from a pattern of the dependency type (e.g., inclusion or referencing a global variable) and the dependency strength, and outputs the identified result as an improvement plan 35. Examples of the improving method include transfer of a reference portion in a global variable, decomposition of a function, and deletion of a function.

FIG. 6 illustrates example improvement plans. FIG. 6 illustrates, as an improvement plan, deletion of the arrow extending from B to A whose dependency type is referencing a global variable and whose dependency strength is 3. FIG. 6 also illustrates, as an improvement plan, deletion of the arrow extending from B to C whose dependency type is a function call and whose dependency strength is 2.

The scale calculator 25 in FIG. 1 receives the improvement plan 35 as input. Then, the scale calculator 25 calculates a man hour of the improvement plan 35, and outputs the calculation result as an improved scale estimation result 36.

The man hour is calculated by, for example, multiplying the man hour per dependency type by the number of modules on the dependency strength or an improvement entry. The man hour per dependency type is set to a predetermined value according to the difficulty of the improvement.

FIG. 7 illustrates example improved scale estimation results, using the improvement plans in FIG. 6 as input. As illustrated in the example of FIG. 7, the man hour taken for the improvement plan on the deletion of the arrow extending from B to A is 30 hours. Furthermore, the man hour taken for the improvement plan on the deletion of the arrow extending from B to C is 10 hours.

Figure 8:
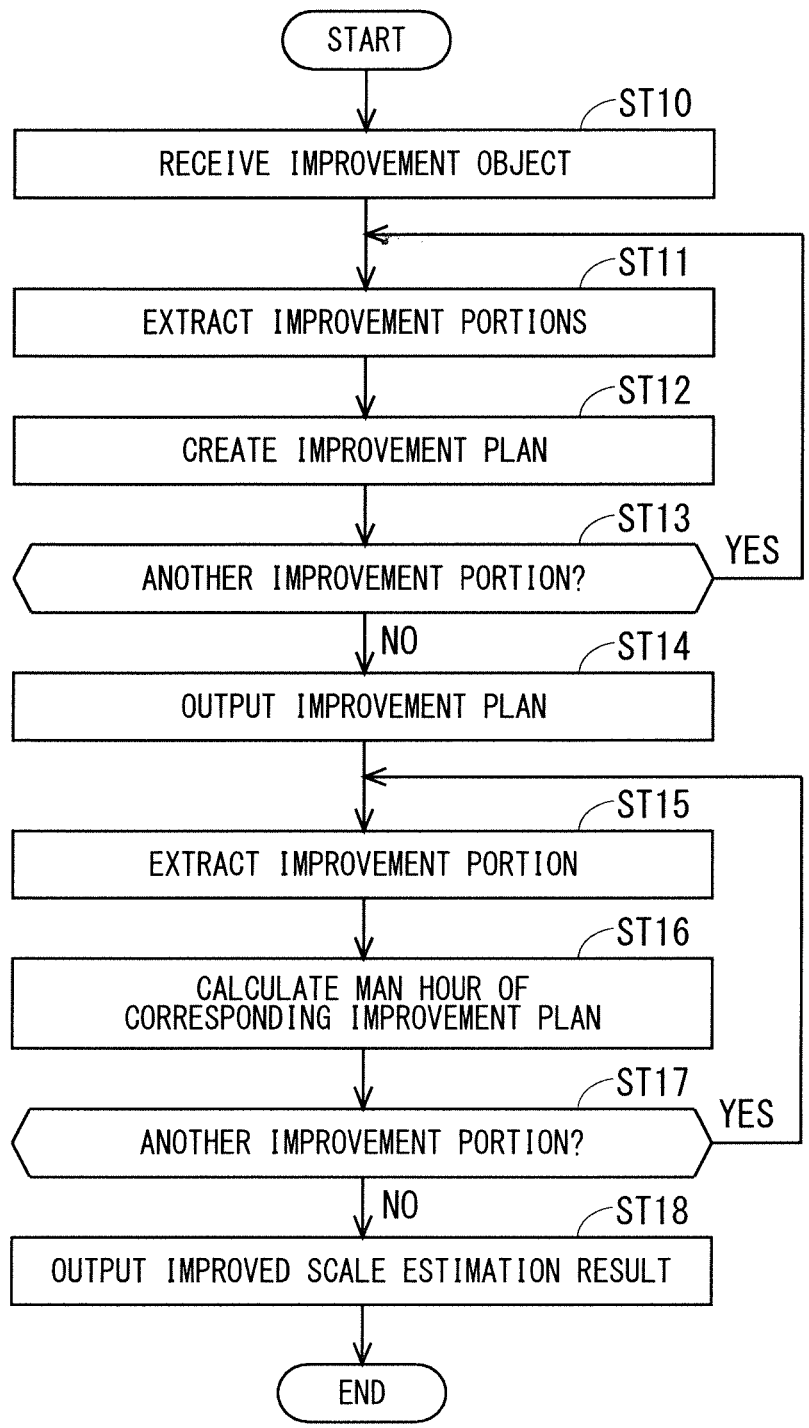
FIG. 8 is a flowchart for outputting an improvement plan and a man hour taken for the improvement plan.

FIG. 8 is a flowchart for outputting an improvement plan and a man hour taken for the improvement plan. As illustrated in the example of FIG. 8, the improvement plan examining unit 24 first receives the improvement object 34 (Step ST10).

Next, the improvement plan examining unit 24 extracts improvement portions from the improvement object 34 (Step ST11). Each of the improvement portions corresponds to at least a part of the improvement object. Examples of the improvement portions include a referring relationship between variables and a call relationship between functions in the software structure (software architecture). According to Embodiment 1, the improvement portions are the arrow extending from B to A and the arrow extending from B to C in FIG. 2.

Next, the improvement plan examining unit 24 creates, based on the extracted improvement portions, an improvement plan for each of the improvement portions (Step ST12).

Next, the improvement plan examining unit 24 determines whether there is another improvement portion (Step ST13). If there is another improvement portion, that is, if YES branch in Step ST13 in the example of FIG. 8 is taken, the processes return to Step ST11, and the improvement plan examining unit 24 extracts another improvement portion. If there is no improvement portion, that is, if NO branch in Step ST13 in the example of FIG. 8 is taken, the processes proceed to Step ST14.

Next, the improvement plan examining unit 24 outputs the improvement plan 35 including the improvement plan corresponding to each of the improvement portions (Step ST14).

Next, the scale calculator 25 extracts the improvement portion from the improvement plan 35 (Step ST15). Then, the scale calculator 25 calculates the man hour of the improvement plan corresponding to the extracted improvement portion (Step ST16).

Next, the scale calculator 25 determines whether there is another improvement portion (Step ST17). If there is another improvement portion, that is, if YES branch in Step ST17 in the example of FIG. 8 is taken, the processes return to Step ST15, and the scale calculator 25 extracts another improvement portion from the improvement plan 35. If there is no improvement portion, that is, if NO branch in Step ST17 in the example of FIG. 8 is taken, the processes proceed to Step ST18.

Next, the scale calculator 25 outputs the improved scale estimation result 36 including the man hour of the improvement plan corresponding to each of the improvement portions (Step ST18).

Consequently, creating an improvement plan for each of the improvement portions of the improvement object 34 extracted from the current software structure database 32 and the target software structure database 33, and outputting the man hour of each of the improvement plans as the improved scale estimation result 36 enable calculation of the man hour (a refactoring scale) of the improvement plan for each of the improvement portions.

Embodiment 2

An improvement proposing device and an improvement proposing method according to Embodiment 2 will be described. In the following description, the same reference numerals are assigned to the same constituent elements as those in aforementioned Embodiment, and the detailed description will be appropriately omitted.

[Configuration of Improvement Proposing Device]

Embodiment 1 describes proposing one pattern of an improvement plan on one improvement portion for improvement into a target software structure.

In contrast, if the improvement plan examining unit 24 can propose the improvement plan on one improvement portion in a plurality of patterns, a refactoring method can be examined from the plurality of patterns. Thus, an improvement plan unsuitable for the capability of a refactoring operator or unsuitable for a software structure is easily avoided.

FIG. 9 is a flowchart for outputting an improvement plan on one improvement portion in a plurality of patterns. As illustrated in the example of FIG. 9, the improvement plan examining unit 24 first receives the improvement object 34 (Step ST20).

Next, the improvement plan examining unit 24 extracts improvement portions from the improvement object 34 (Step ST21). Next, the improvement plan examining unit 24 creates an improvement plan based on each of the extracted improvement portions (Step ST22).

Next, the improvement plan examining unit 24 determines whether there is another improvement plan for the improvement portion (Step ST23). If there is another improvement plan, for example, if an improvement plan for preventing an increase in a new fault is found, that is, if YES branch in Step ST23 in the example of FIG. 9 is taken, the processes return to Step ST22, and the improvement plan examining unit 24 creates another improvement plan. If there is no improvement plan, that is, if NO branch in Step ST23 in the example of FIG. 9 is taken, the processes proceed to Step ST24.

Next, the improvement plan examining unit 24 determines whether there is another improvement portion (Step ST24). If there is another improvement portion, that is, if YES branch in Step ST24 in the example of FIG. 9 is taken, the processes return to Step ST21, and the improvement plan examining unit 24 extracts another improvement portion. If there is no improvement portion, that is, if NO branch in Step ST24 in the example of FIG. 9 is taken, the processes proceed to Step ST25.

Next, the improvement plan examining unit 24 outputs the improvement plan 35 (Step ST25). Then, the scale calculator 25 calculates the man hour of a plurality of improvement plans for each of the improvement portions.

FIG. 10 illustrates an example where an improvement plan on one improvement portion is extracted in a plurality of patterns. Here, the improvement portions of the improvement plan in FIG. 10 are the arrow extending from B to A and the arrow extending from B to C in FIG. 2.

As illustrated in the example of FIG. 10, the dependency type of the arrow extending from B to A in FIG. 2 is referencing a global variable, and the dependency strength thereof is 3. Furthermore, the improvement plan on the arrow extending from B to A in FIG. 2 is deletion or transfer.

As also illustrated in the example of FIG. 10, the dependency type of the arrow extending from B to C in FIG. 2 is a function call, and the dependency strength thereof is 2. Furthermore, the improvement plan on the arrow extending from B to C in FIG. 2 is deletion or transfer.

Consequently, enabling selection of an improvement plan on one improvement portion from a plurality of patterns enables refactoring with a high degree of flexibility.

Embodiment 3

An improvement proposing device and an improvement proposing method according to Embodiment 3 will be described. In the following description, the same reference numerals are assigned to the same constituent elements as those in aforementioned Embodiments, and the detailed description will be appropriately omitted.

[Configuration of Improvement Proposing Device]

Embodiment 2 describes outputting an improvement plan on one improvement portion in a plurality of patterns.

In contrast, one of improvement objects 34 can be prioritized, and an improvement plan for the prioritized improvement object 34 can be outputted. This enables refactoring with a high degree of flexibility.

In Embodiment 3, an improvement range that is a range for specifying the improvement objects 34 to be preferentially improved is established for defining improvement plans to be prioritized. The use of this improvement range enables output of at least one improvement plan to which improvement plans with the plurality of patterns are narrowed down in the range of the improvement objects to be preferentially improved.

Figure 11:
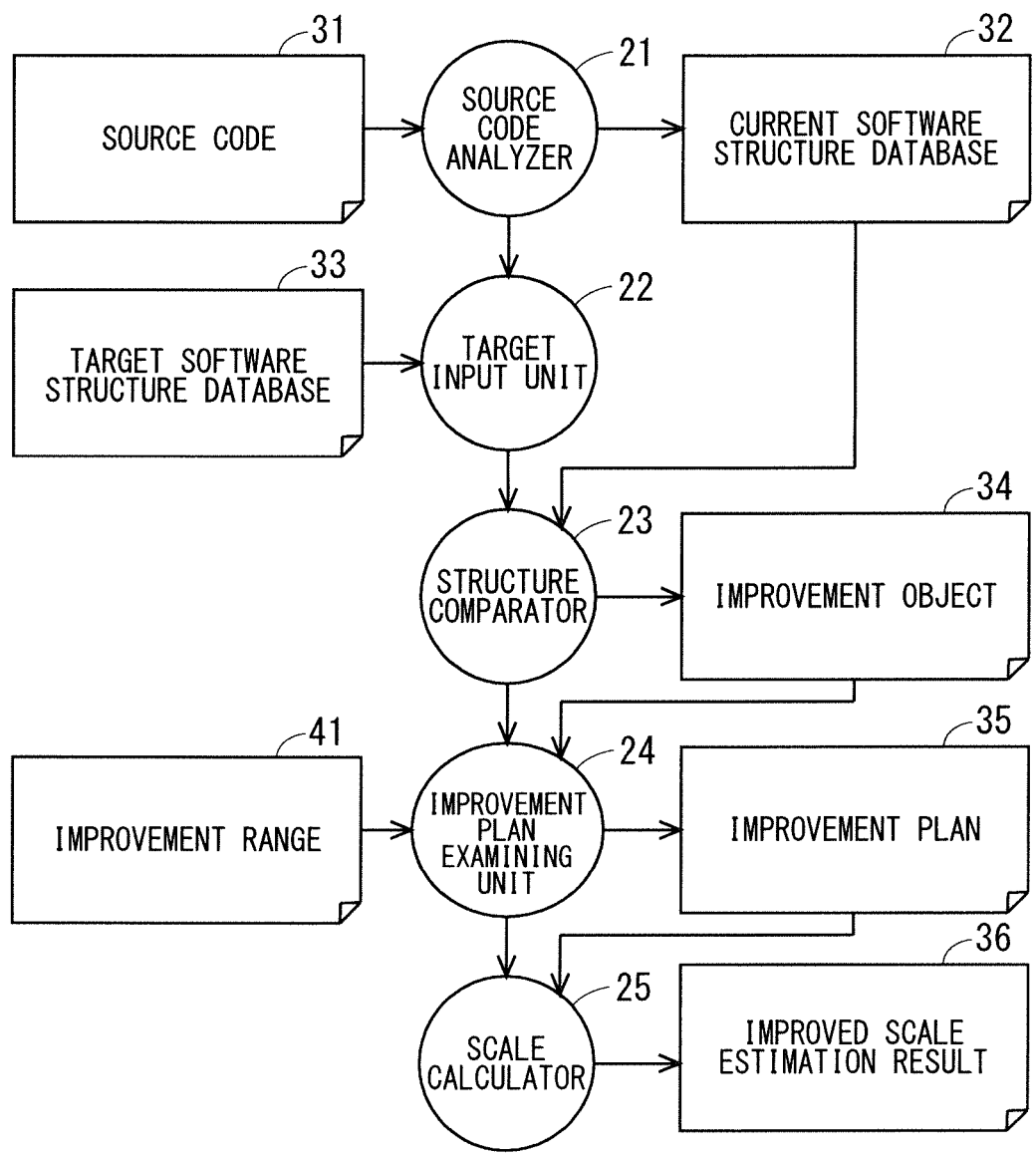
FIG. 11 conceptually illustrates an example configuration of an improvement proposing device according to an embodiment.

FIG. 11 conceptually illustrates an example configuration of the improvement proposing device according to Embodiment 3. As illustrated in the example of FIG. 11, the improvement proposing device includes the source code analyzer 21, the target input unit 22, the structure comparator 23, the improvement plan examining unit 24, and the scale calculator 25.

The input of the target input unit 22 is connected to the output of the source code analyzer 21. The input of the structure comparator 23 is connected to the output of the target input unit 22.

The input of the improvement plan examining unit 24 is connected to the output of the structure comparator 23. The input of the scale calculator 25 is connected to the output of the improvement plan examining unit 24.

The improvement plan examining unit 24 receives the improvement object 34 and an improvement range 41 as input. Furthermore, examples of an entry specified as the improvement range include a file, a folder including a plurality of files, and a dependency type.

The source code analyzer 21 receives the source code 31 as input. The source code analyzer 21 extracts a current software structure from the received source code 31. Then, the source code analyzer 21 outputs the current software structure database 32 including the extracted current software structure.

Figure 12:
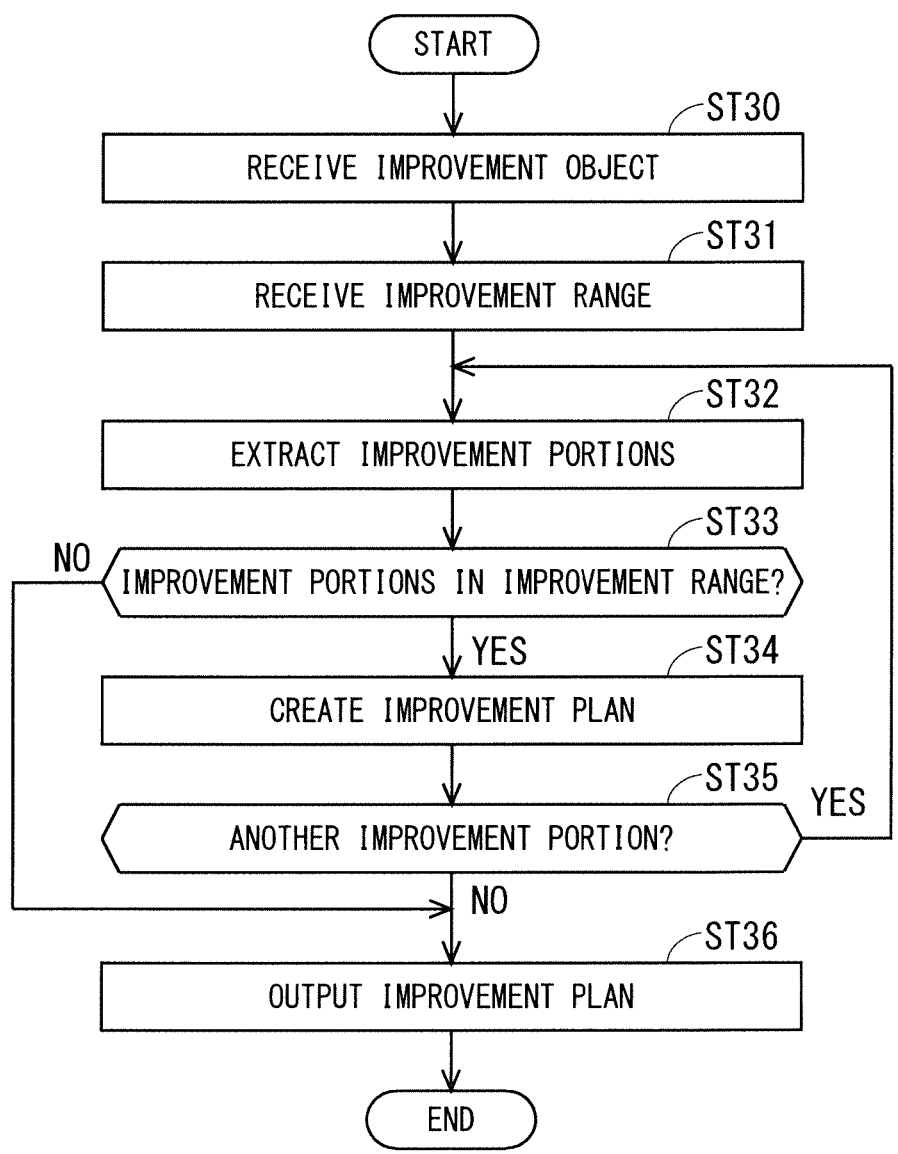
FIG. 12 is a flowchart for specifying an improvement range and outputting an improvement plan.

FIG. 12 is a flowchart for specifying an improvement range and outputting an improvement plan. As illustrated in the example of FIG. 12, the improvement plan examining unit 24 first receives the improvement object 34 (Step ST30).

Next, the improvement plan examining unit 24 receives the improvement range 41 (Step ST31). Next, the improvement plan examining unit 24 extracts improvement portions from the improvement object 34 (Step ST32).

Next, the improvement plan examining unit 24 determines whether the extracted improvement portions are improvement portions extracted from the improvement object in the improvement range 41 (Step ST33). If the improvement portions are the improvement portions extracted from the improvement object in the improvement range 41, that is, if YES branch in Step ST33 in the example of FIG. 12 is taken, the processes proceed to Step ST34. If the improvement portions are not the improvement portions extracted from the improvement object in the improvement range 41, that is, if NO branch in Step ST33 in the example of FIG. 12 is taken, the processes proceed to Step ST36.

Next, the improvement plan examining unit 24 creates, based on the improvement portions extracted from the improvement object in the improvement range 41, an improvement plan for each of the improvement portions (Step ST34).

Next, the improvement plan examining unit 24 determines whether there is another improvement portion (Step ST35). If there is another improvement portion, that is, if YES branch in Step ST35 in the example of FIG. 12 is taken, the processes return to Step ST32, and the improvement plan examining unit 24 extracts another improvement portion. If there is no improvement portion, that is, if NO branch in Step ST35 in the example of FIG. 12 is taken, the processes proceed to Step ST36.

Next, the improvement plan examining unit 24 outputs the improvement plan 35 including an improvement plan corresponding to each of the improvement portions (Step ST36). Then, the scale calculator 25 calculates the man hour of the improvement plan for each of the improvement portions in the improvement range 41.

Consequently, specifying the improvement range 41 enables output of the improvement plans for the improvement portions narrowed down in the improvement range 41. This enables refactoring with a high degree of flexibility.

Embodiment 4

An improvement proposing device and an improvement proposing method according to Embodiment 4 will be described. In the following description, the same reference numerals are assigned to the same constituent elements as those in aforementioned Embodiments, and the detailed description will be appropriately omitted.

[Configuration of Improvement Proposing Device]

Although entries other than those specified by the improvement range 41 are not output as the improvement plan 35 in Embodiment 3, specification of an improvement priority enables output of an improvement plan for the improvement object 34 to which the improvement priorities are assigned.

Figure 13:
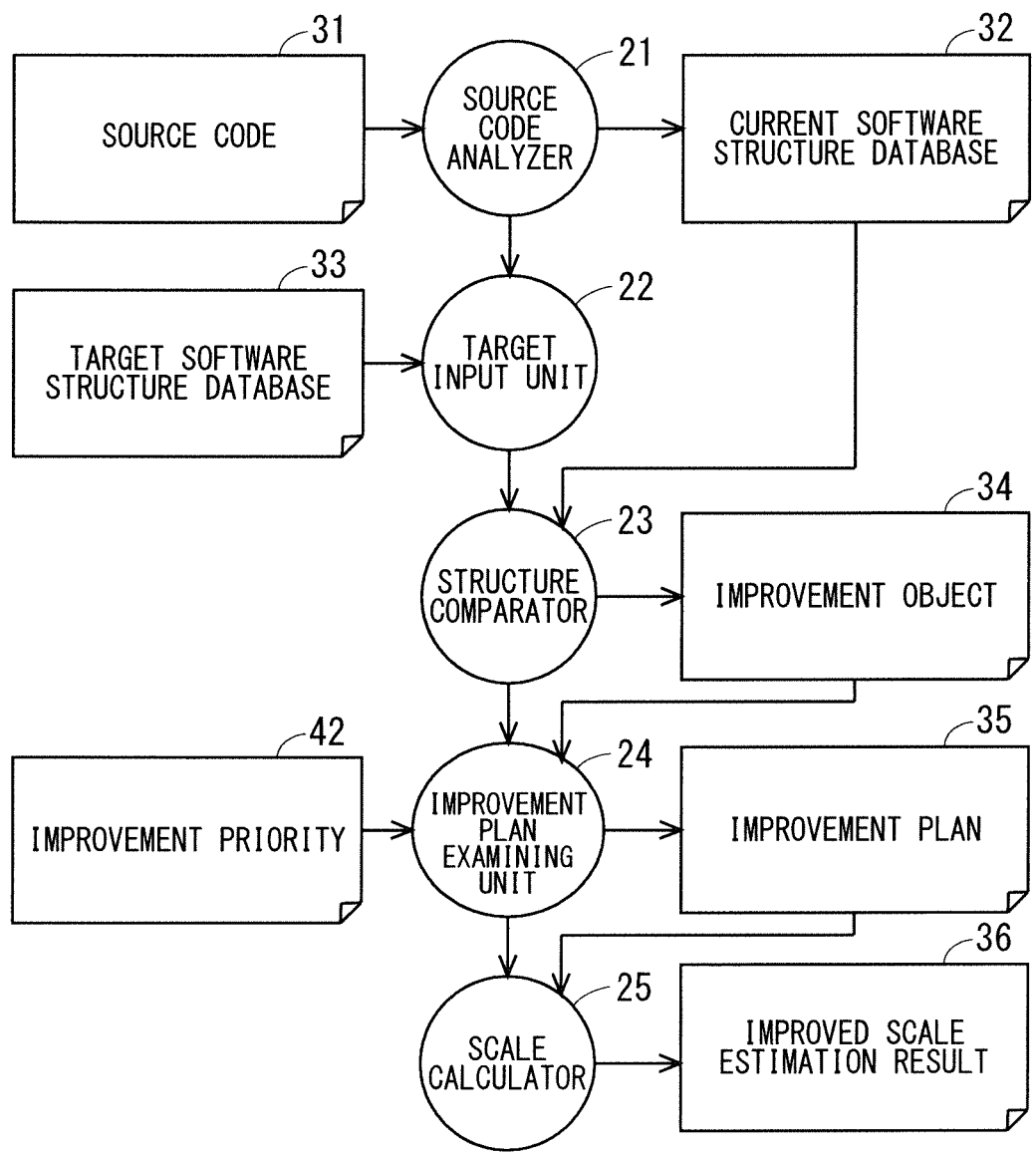
FIG. 13 conceptually illustrates an example configuration of an improvement proposing device according to an embodiment.

FIG. 13 conceptually illustrates an example configuration of the improvement proposing device according to Embodiment 4. As illustrated in the example of FIG. 13, the improvement proposing device includes the source code analyzer 21, the target input unit 22, the structure comparator 23, the improvement plan examining unit 24, and the scale calculator 25.

The input of the target input unit 22 is connected to the output of the source code analyzer 21. The input of the structure comparator 23 is connected to the output of the target input unit 22.

The input of the improvement plan examining unit 24 is connected to the output of the structure comparator 23. The input of the scale calculator 25 is connected to the output of the improvement plan examining unit 24.

The improvement plan examining unit 24 receives the improvement object 34 and an improvement priority 42 as input. Examples of the improvement priority include a file, a folder including a plurality of files, and a dependency type.

Figure 14:
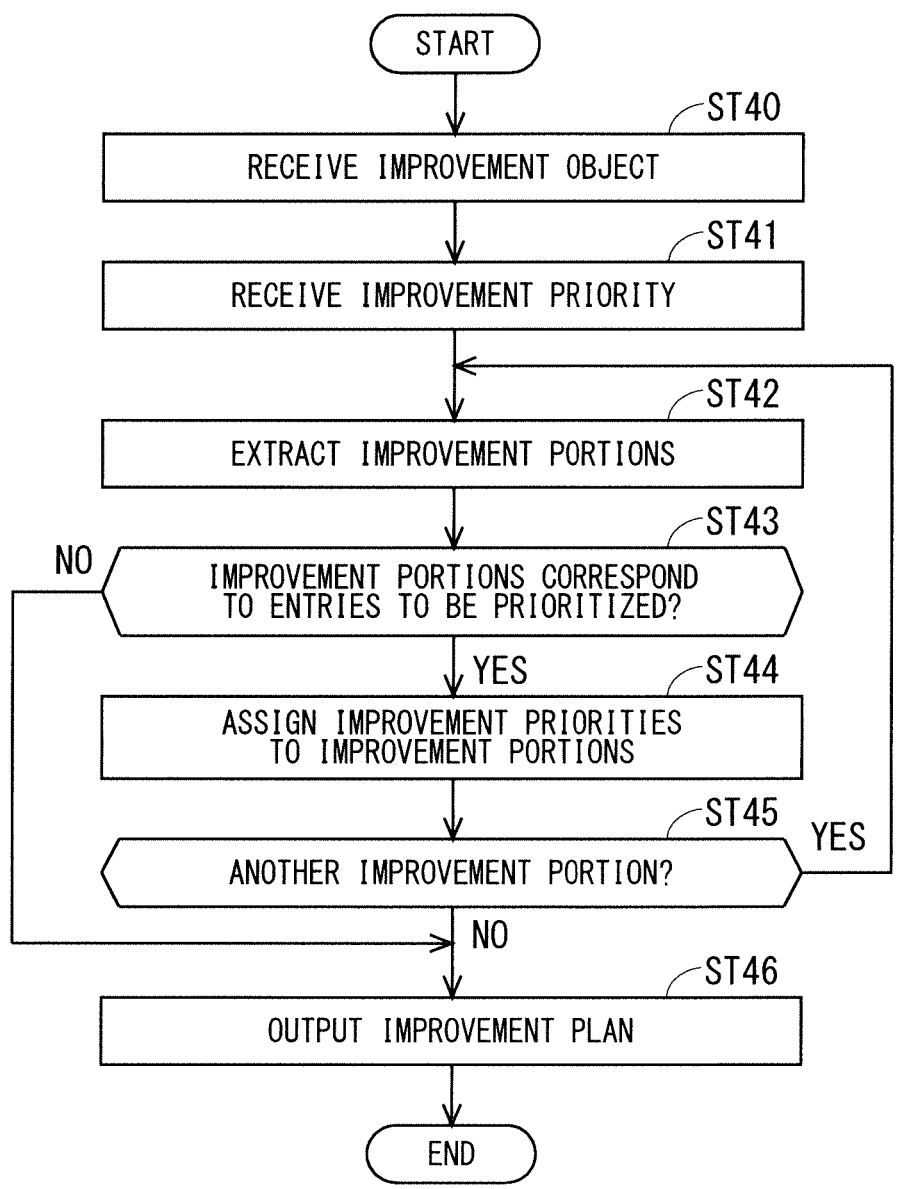
FIG. 14 is a flowchart for assigning an improvement priority to an improvement object and outputting an improvement plan.

FIG. 14 is a flowchart for assigning an improvement priority to an improvement object and outputting an improvement plan. As illustrated in the example of FIG. 14, the improvement plan examining unit 24 first receives the improvement object 34 (Step ST40).

Next, the improvement plan examining unit 24 receives the improvement priority 42 (Step ST41). Next, the improvement plan examining unit 24 extracts improvement portions from the improvement object 34 (Step ST42).

Next, the improvement plan examining unit 24 determines whether the extracted improvement portions corresponds to entries to be prioritized (Step ST43). If the improvement portions correspond to the entries to be prioritized, that is, if YES branch in Step ST43 in the example of FIG. 14 is taken, the processes proceed to Step ST44. If the improvement portions do not correspond to the entries to be prioritized, that is, if NO branch in Step ST43 in the example of FIG. 14 is taken, the processes proceed to Step ST46.

Next, the improvement plan examining unit 24 assigns improvement priorities to the improvement portions (Step ST44). Examples of the improvement priorities to be assigned include three of high, middle, and low levels.

Next, the improvement plan examining unit 24 determines whether there is another improvement portion (Step ST45). If there is another improvement portion, that is, if YES branch in Step ST45 in the example of FIG. 14 is taken, the processes return to Step ST42, and the improvement plan examining unit 24 extracts another improvement portion. If there is no improvement portion, that is, if NO branch in Step ST45 in the example of FIG. 14 is taken, the processes proceed to Step ST46.

Next, the improvement plan examining unit 24 outputs the improvement plan 35 in which the improvement priorities have been considered (Step ST46). Examples of the improvement plan 35 in which the improvement priorities have been considered include an improvement plan including a plurality of improvement portions with higher improvement priorities. Then, the scale calculator 25 calculates the man hour of the improvement plan for each of the improvement portions, based on the improvement priorities.

Consequently, assignment of the improvement priorities to the improvement object 34 enables refactoring in view of, for example, the priorities of the improvement portions.

Embodiment 5

An improvement proposing device and an improvement proposing method according to Embodiment 5 will be described. In the following description, the same reference numerals are assigned to the same constituent elements as those in aforementioned Embodiments, and the detailed description will be appropriately omitted.

[Configuration of Improvement Proposing Device]

Embodiment 4 exemplifies output of the improvement plan 35 to which the improvement priorities are assigned.

In contrast, a situation of specifying only an improvement plan sometimes requires reexamination of an implementation plan that is a specific way of implementing the improvement plan in a source code to ascertain the effect of the improvement.

Here, proposing, based on the improvement plan, at least one implementation plan that satisfies the target software structure and enables operations equivalent to those of the current software enables effective refactoring.

Figure 15:
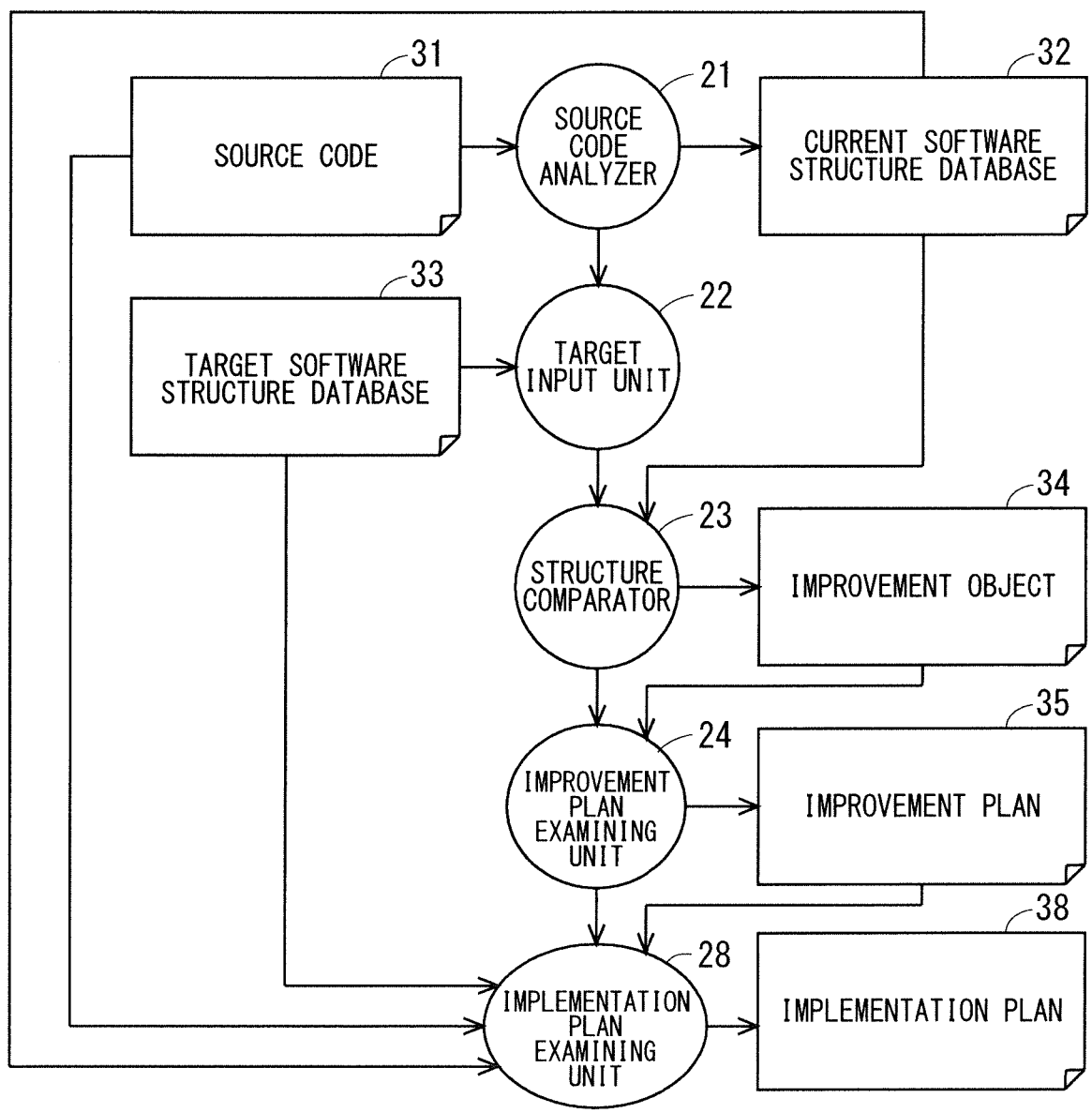
FIG. 15 conceptually illustrates an example configuration of an improvement proposing device according to an embodiment.

FIG. 15 conceptually illustrates an example configuration of the improvement proposing device according to Embodiment 5. As illustrated in the example of FIG. 15, the improvement proposing device includes the source code analyzer 21, the target input unit 22, the structure comparator 23, the improvement plan examining unit 24, and an implementation plan examining unit 28 that outputs at least one implementation plan 38.

The input of the target input unit 22 is connected to the output of the source code analyzer 21. The input of the structure comparator 23 is connected to the output of the target input unit 22.

The input of the improvement plan examining unit 24 is connected to the output of the structure comparator 23. The input of the implementation plan examining unit 28 is connected to the output of the improvement plan examining unit 24.

Figure 16:
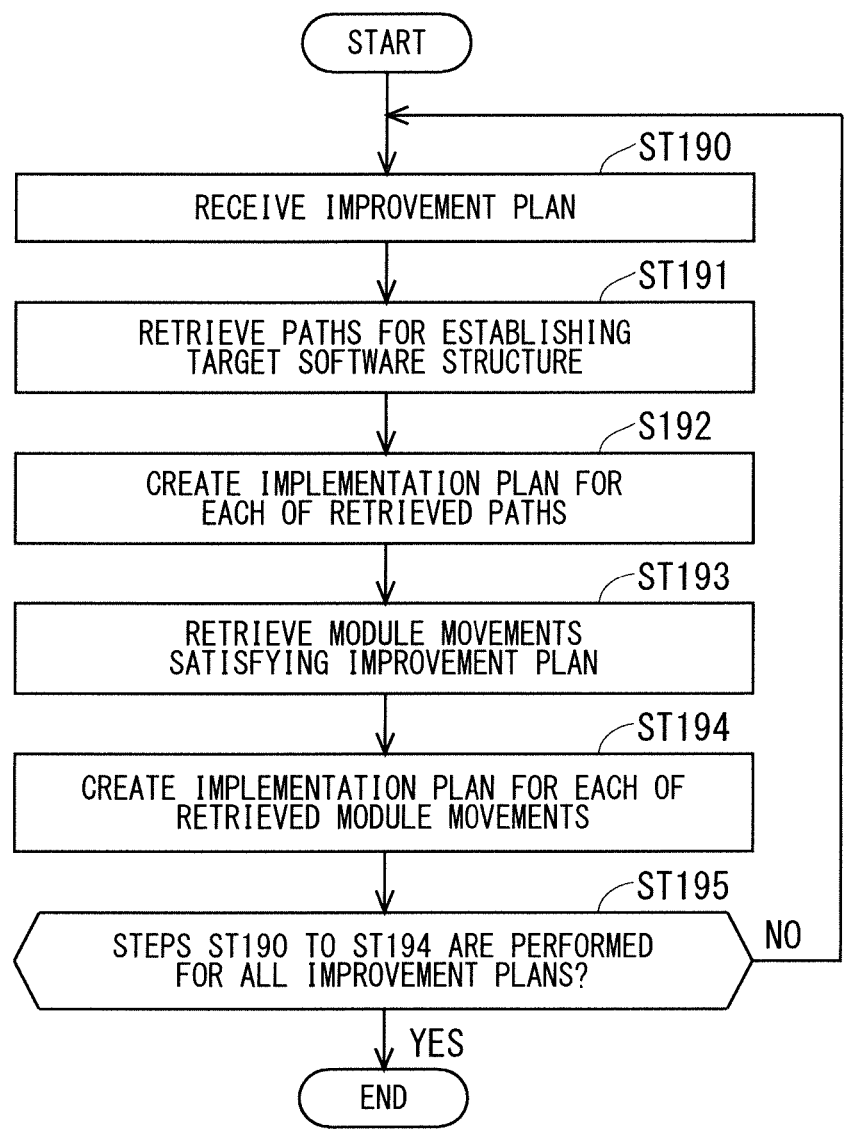
FIG. 16 is a flowchart for an implementation plan examining unit to output an implementation plan of each improvement plan using the improvement plans as input.

FIG. 16 is a flowchart for the implementation plan examining unit 28 to output the implementation plan 38 of each improvement plan, using the improvement plans as input. As illustrated in the example of FIG. 16, the implementation plan examining unit 28 first receives the improvement plan 35 (Step ST190).

Next, the implementation plan examining unit 28 retrieves paths for establishing the target software structure using the improvement plan 35, with reference to the target software structure database 33 (Step ST191). For example, when a function call is deleted, a bypassing call is used as the path.

Next, the implementation plan examining unit 28 creates the implementation plan 38 for each of the retrieved paths (Step ST192). For example, if the path is a bypassing path, the bypassing path is created as the implementation plan 38.

Next, the implementation plan examining unit 28 retrieves module movements satisfying the improvement plan 35, with reference to the target software structure database 33 (Step ST193). Examples of the module movements include moving a calling source and a calling destination to the same module.

Next, the implementation plan examining unit 28 creates the implementation plan 38 for each of the retrieved module movements (Step ST194).

Next, the implementation plan examining unit 28 determines whether Steps ST190 to ST194 are performed for all the improvement plans (Step ST195). If the aforementioned Steps are performed for all the improvement plans, that is, if YES branch in Step ST195 in the example of FIG. 16 is taken, the operations end. If there is an improvement plan for which the aforementioned Steps are not performed, that is, if NO branch in Step ST195 in the example of FIG. 16 is taken, the processes return to Step ST190.

FIG. 17 illustrates examples of the implementation plan 38. The example of FIG. 17 illustrates the implementation plans 38 corresponding to "DELETE B to A" in the improvement plans in the example of FIG. 6.

FIG. 17 exemplifies four of the implementation plans 38 as the implementation plans 38 corresponding to "DELETE B to A", that is, the implementation plans 38 for deleting the reference from B to A.

Specifically, FIG. 17 exemplifies the implementation plan 38 for changing B to C (an existing function) to A, the implementation plan 38 for changing B to D (a new function) to A, the implementation plan 38 for moving B calling A to A, and the implementation plan 38 for combining B and A.

Consequently, the plurality of implementation plans 38 can be specified for one improvement plan. Proposing the implementation plans 38 facilitates examination of the improvement, and enables efficient improvement.

Embodiment 6

An improvement proposing device and an improvement proposing method according to Embodiment 6 will be described. In the following description, the same reference numerals are assigned to the same constituent elements as those in aforementioned Embodiments, and the detailed description will be appropriately omitted.

[Configuration of Improvement Proposing Device]

Embodiment 5 specifies, based on the improvement plan, the implementation plans 38 that satisfies the target software structure and enables operations equivalent to those of the current software.

When one or more of the implementation plans 38 for a plurality of improvement plans are specified, the dependency between the implementation plans 38 sometimes makes it difficult to implement the implementation plans 38 in a source code. In Embodiment 6, the dependency between the implementation plans 38 is analyzed for creating an integrated implementation plan 39 that can improve the architecture as the whole software structure.

Figure 18:
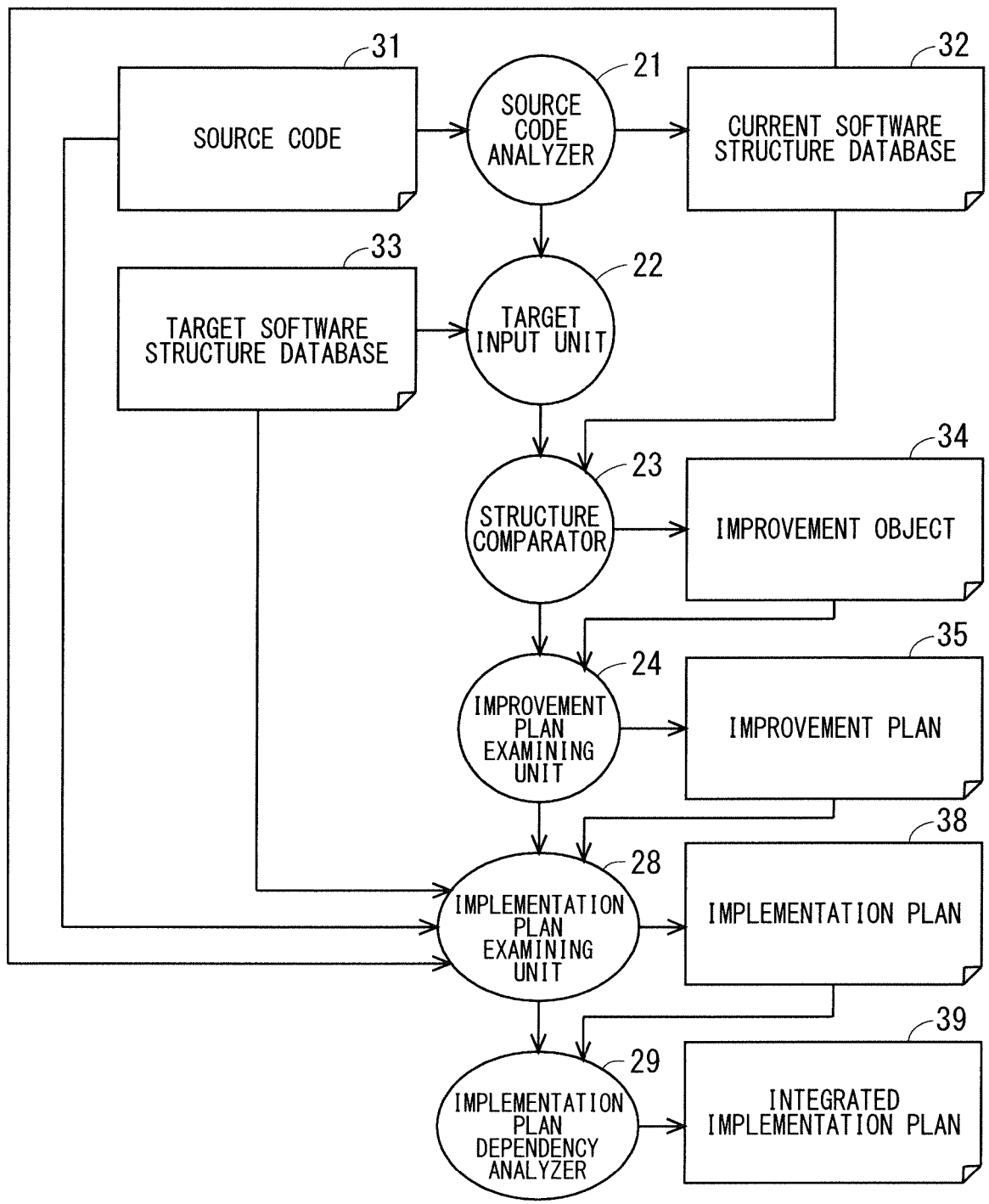
FIG. 18 conceptually illustrates an example configuration of an improvement proposing device according to an embodiment.

FIG. 18 conceptually illustrates an example configuration of the improvement proposing device according to Embodiment 6. As illustrated in the example of FIG. 18, the improvement proposing device includes the source code analyzer 21, the target input unit 22, the structure comparator 23, the improvement plan examining unit 24, the implementation plan examining unit 28 that outputs the implementation plans 38, and an implementation plan dependency analyzer 29 that outputs the integrated implementation plan 39.

The input of the target input unit 22 is connected to the output of the source code analyzer 21. The input of the structure comparator 23 is connected to the output of the target input unit 22.

The input of the improvement plan examining unit 24 is connected to the output of the structure comparator 23. The input of the implementation plan examining unit 28 is connected to the output of the improvement plan examining unit 24.

The input of the implementation plan dependency analyzer 29 is connected to the output of the implementation plan examining unit 28.

Figure 19:
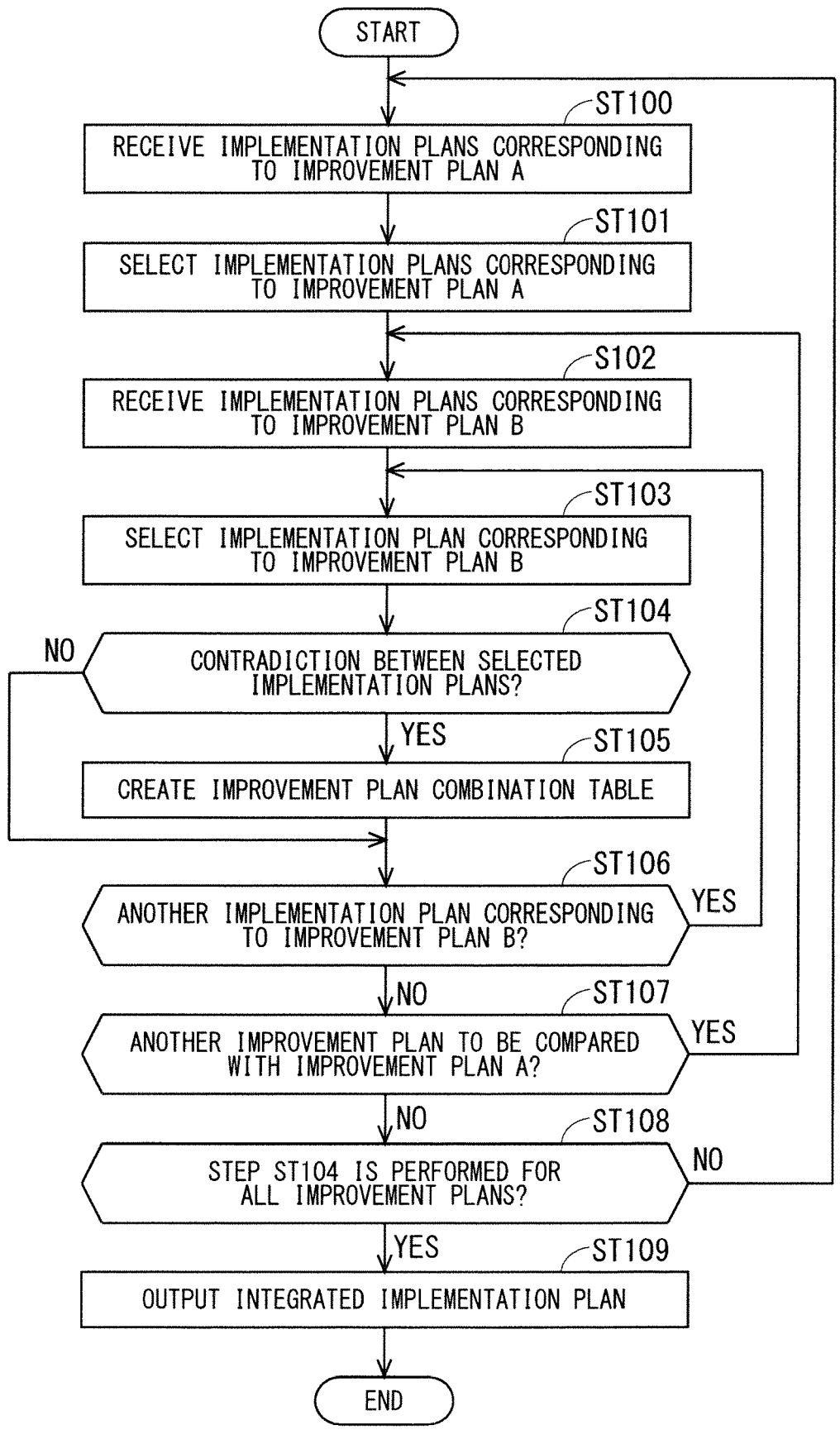
FIG. 19 is a flowchart for an implementation plan dependency analyzer to analyze dependency between implementation plans using the implementation plans as input, and output an integrated implementation plan.

FIG. 19 is a flowchart for the implementation plan dependency analyzer 29 to analyze the dependency between the implementation plans using the implementation plans as input, and output the integrated implementation plan 39. As illustrated in the example of FIG. 19, the implementation plan dependency analyzer 29 first receives a plurality of the implementation plans 38 corresponding to a target improvement plan (herein an improvement plan A) (Step ST100).

Next, the implementation plan dependency analyzer 29 subsequently selects a plurality of implementation plans corresponding to the improvement plan A (implementation plans A1 to A4) (Step ST101).

Next, the implementation plan dependency analyzer 29 receives a plurality of implementation plans corresponding to an improvement plan other than the target improvement plan (herein an improvement plan B) (Step ST102).

Next, the implementation plan dependency analyzer 29 selects one of the implementation plans corresponding to the improvement plan B (implementation plans B1 to B3) (Step ST103).

Next, the implementation plan dependency analyzer 29 determines whether there is a contradiction between the selected implementation plans (Step ST104). If there is a contradiction between the selected implementation plans, that is, if YES branch in Step ST104 in the example of FIG. 19 is taken, the processes proceed to Step ST105. If there is no contradiction between the selected implementation plans, that is, if NO branch in Step ST104 in the example of FIG. 19 is taken, the processes proceed to Step ST106.

Examples of the contradiction between the selected implementation plans include calling a function deleted in one of the implementation plans, in the other implementation plan, and moving, to different modules in the respective implementation plans, a module common to the implementation plans.

In Step ST105, the implementation plan dependency analyzer 29 creates an improvement plan combination table.

FIG. 20 illustrates an example improvement plan combination table. As illustrated in the example of FIG. 20, the improvement plan combination table includes a plurality of implementation plans corresponding to each of improvement plans which are arranged in rows and columns, and marks each representing a contradiction between the implementation plans. The mark herein may be another data functioning as a mark.

The implementation plan dependency analyzer 29 registers the presence or absence of a contradiction between each pair of the implementation plans arranged in the rows and the columns of the improvement plan combination table, based on the result of the determination in Step ST104. Then, the processes proceed to Step ST106.

In Step ST106, whether there is another implementation plan corresponding to the improvement plan B is determined. If there is another implementation plan corresponding to the improvement plan B, that is, if YES branch in Step ST106 in the example of FIG. 19 is taken, the processes return to Step ST103. If there is no implementation plan corresponding to the improvement plan B, that is, if NO branch in Step ST106 in the example of FIG. 19 is taken, the processes proceed to Step ST107.

In Step ST107, whether there is another improvement plan to be compared with the improvement plan A is determined. If there is another improvement plan to be compared with the improvement plan A, that is, if YES branch in Step ST107 in the example of FIG. 19 is taken, the processes return to Step ST102. If there is no improvement plan to be compared with the improvement plan A, that is, if NO branch in Step ST107 in the example of FIG. 19 is taken, the processes proceed to Step ST108.

In Step ST108, whether Step ST104 is performed for all the improvement plans is determined. If Step ST104 is performed for all the improvement plans, that is, if YES branch in Step ST108 in the example of FIG. 19 is taken, the processes proceed to Step ST109. If the improvement plan for which Step ST104 has not yet been performed remains, that is, if NO branch in Step ST108 in the example of FIG. 19 is taken, the processes return to Step ST100.

In Step ST109, the implementation plan dependency analyzer 29 extracts a pair of the implementation plans without any mark representing a contradiction (i.e., the implementation plans without any contradiction from among the implementation plans) from the improvement plan combination table, and outputs the pair as the integrated implementation plan 39.

Consequently, analyzing a contradiction occurring between a plurality of implementation plans enables extraction of implementation plans that can be implemented except pairs of implementation plans with contradictions.

Embodiment 7

An improvement proposing device and an improvement proposing method according to Embodiment 7 will be described. In the following description, the same reference numerals are assigned to the same constituent elements as those in aforementioned Embodiments, and the detailed description will be appropriately omitted.

[Configuration of Improvement Proposing Device]

Embodiment 4 exemplifies outputting the improvement plan 35 to which the improvement priorities have been assigned, according to a priority based on the improvement priority 42.

Although improvement plans are independently examined, the accuracy of priorities of the improvement plans can be increased by considering a relationship between the improvement plans.

Figure 21:
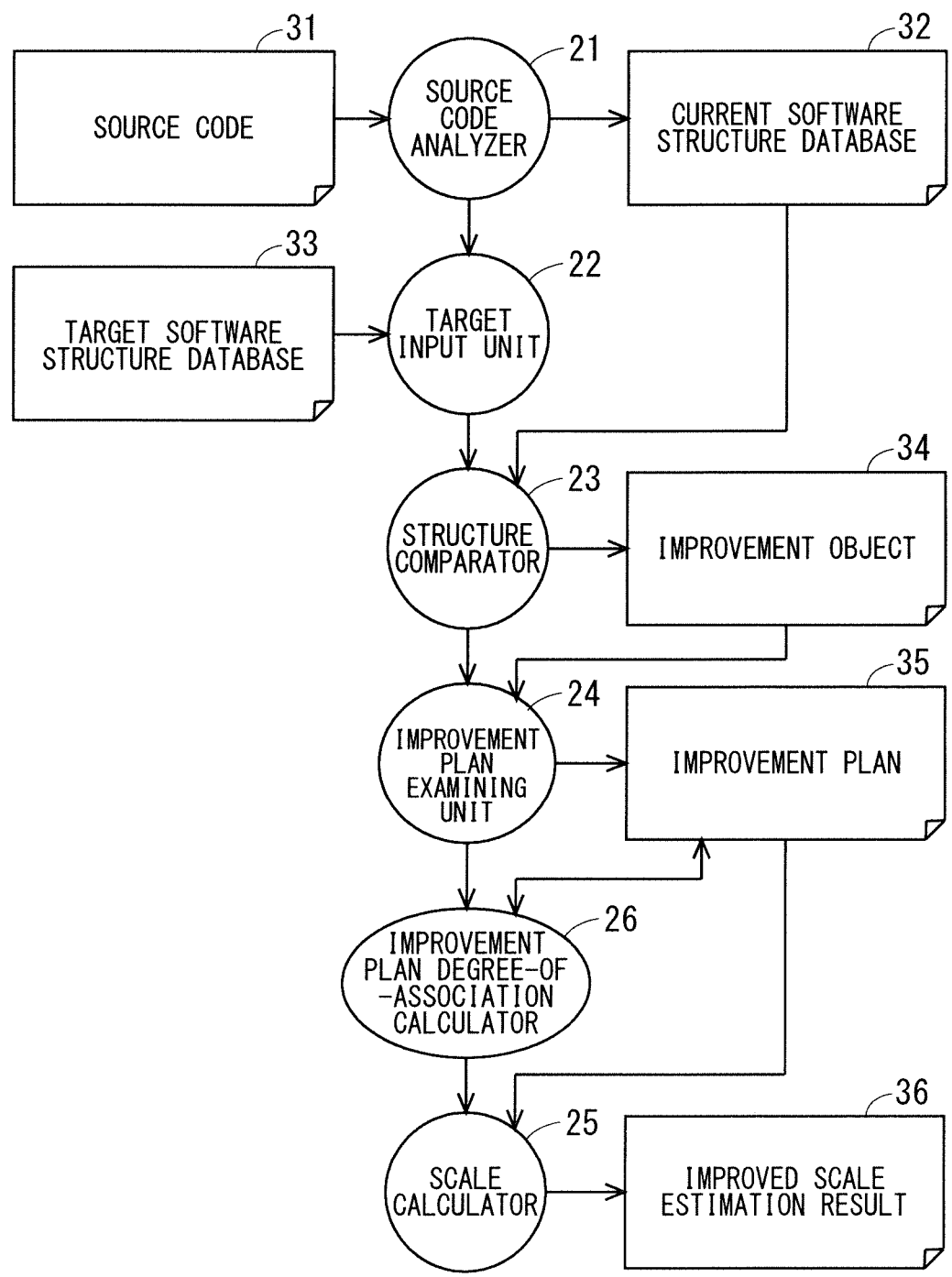
FIG. 21 conceptually illustrates an example configuration of an improvement proposing device according to an embodiment.

FIG. 21 conceptually illustrates an example configuration of the improvement proposing device according to Embodiment 7. As illustrated in the example of FIG. 21, the improvement proposing device includes the source code analyzer 21, the target input unit 22, the structure comparator 23, the improvement plan examining unit 24, an improvement plan degree-of-association calculator 26, and the scale calculator 25.

Figure 22:
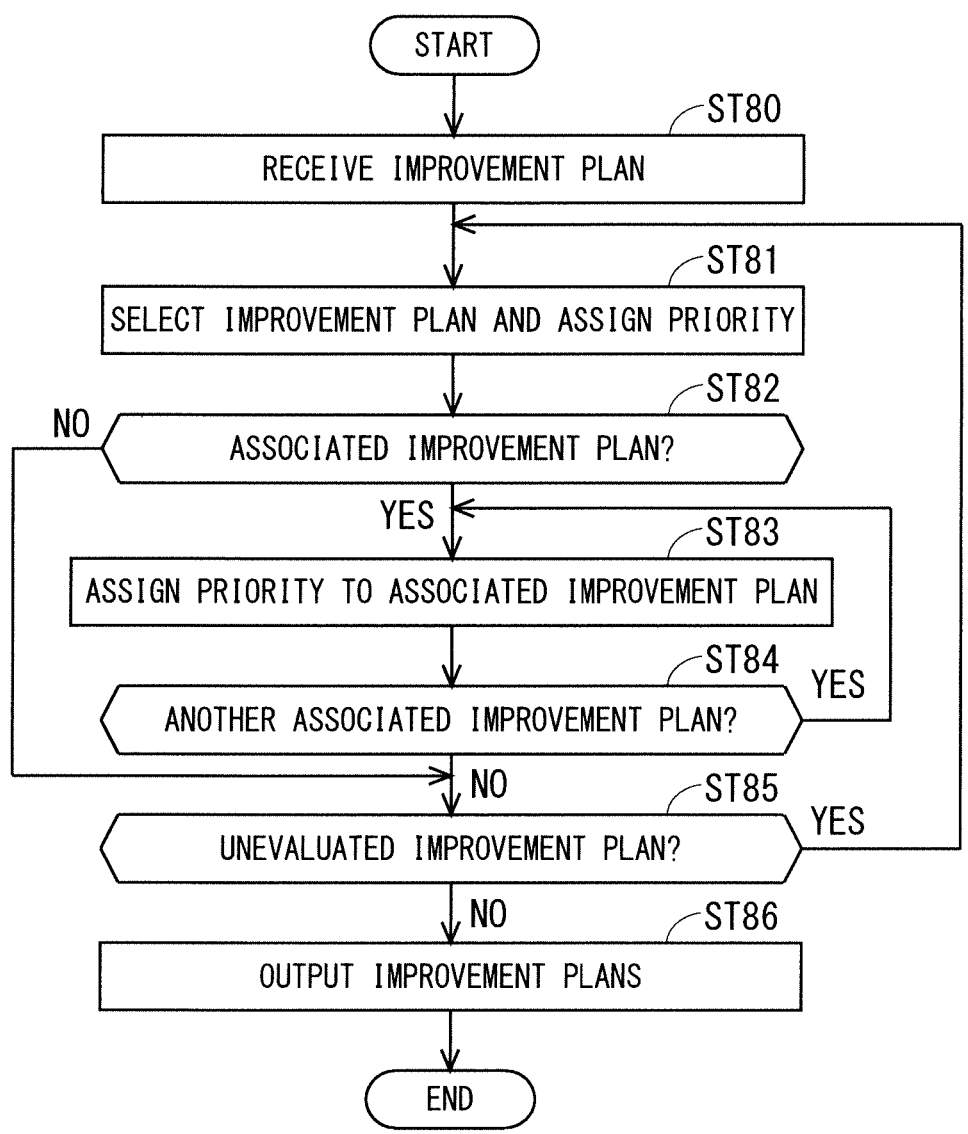
FIG. 22 is a flowchart for assigning priorities to improvement plans received by an improvement plan degree-of-association calculator, and outputting the improvement plans with reviewed priorities.

FIG. 22 is a flowchart for assigning priorities to the improvement plans 35 received by the improvement plan degree-of-association calculator 26, and outputting the improvement plans 35 with reviewed priorities.

First, the improvement plan degree-of-association calculator 26 receives the improvement plans 35 (Step ST80).

Next, the improvement plan degree-of-association calculator 26 selects an unevaluated improvement plan from among the received improvement plans 35, and assigns a default priority to the unevaluated improvement plan when the priority is not set (Step ST81). Examples of the default priority to be assigned include a value.

Next, the improvement plan degree-of-association calculator 26 determines whether there is an improvement plan associated with the selected improvement plan (Step ST82). If there is an associated improvement plan, that is, if YES branch in Step ST82 in the example of FIG. 22 is taken, the processes proceed to Step ST83. If there is no associated improvement plan, that is, if NO branch in Step ST82 in the example of FIG. 22 is taken, the processes proceed to Step ST85.

A method for determining the associated improvement plan is not particularly specified. Examples of the associated improvement plan include a similar improvement plan, an improvement plan requiring earlier improvement, and an improvement plan requiring later improvement.

Next, the improvement plan degree-of-association calculator 26 assigns an improvement priority to the associated improvement plan according to a degree of association (a degree of dependency) (Step ST83).

For example, the improvement plan degree-of-association calculator 26 assigns the same value as that of the target improvement plan if the associated improvement plan is a similar improvement plan, assigns a value higher than that of the target improvement plan if the associated improvement plan is an improvement plan requiring earlier improvement, or assigns a value lower than that of the target improvement plan if the associated improvement plan is an improvement plan requiring later improvement.

Next, the improvement plan degree-of-association calculator 26 determines whether there is another associated improvement plan (Step ST84). If there is another improvement plan, that is, if YES branch in Step ST84 in the example of FIG. 22 is taken, the processes return to Step ST83, and the improvement plan degree-of-association calculator 26 assigns an improvement priority to the other improvement plan. If there is no improvement plan, that is, if NO branch in Step ST84 in the example of FIG. 22 is taken, the processes proceed to Step ST85.

Next, the improvement plan degree-of-association calculator 26 determines whether there is another unevaluated improvement plan (Step ST85). If there is another unevaluated improvement plan, that is, if YES branch in Step ST85 in the example of FIG. 22 is taken, the processes return to Step ST81, and the improvement plan degree-of-association calculator 26 assigns an improvement priority to the improvement plan. If there is no improvement plan, that is, if NO branch in Step ST85 in the example of FIG. 22 is taken, the processes proceed to Step ST86.

Next, the improvement plan degree-of-association calculator 26 outputs the improvement plans 35 each including the improvement priority (Step ST86). Examples of the improvement plans 35 each including the improvement priority include improvement plans arranged in order of the improvement priorities.

Consequently, the improvement plan degree-of-association calculator 26 calculates a degree of association (a degree of dependency) between improvement plans and assigns or reviews the priorities, which can preferentially refactor a similar improvement or a highly relevant improvement portion.

Embodiment 8

An improvement proposing device and an improvement proposing method according to Embodiment 8 will be described. In the following description, the same reference numerals are assigned to the same constituent elements as those in aforementioned Embodiments, and the detailed description will be appropriately omitted.

[Configuration of Improvement Proposing Device]

In Embodiment 8, the scale calculator 25 receives an improvement man hour as a predefined threshold, so that the improvement plan 35 in which the man hour specified by the operator in advance has been considered can be output.

Figure 23:
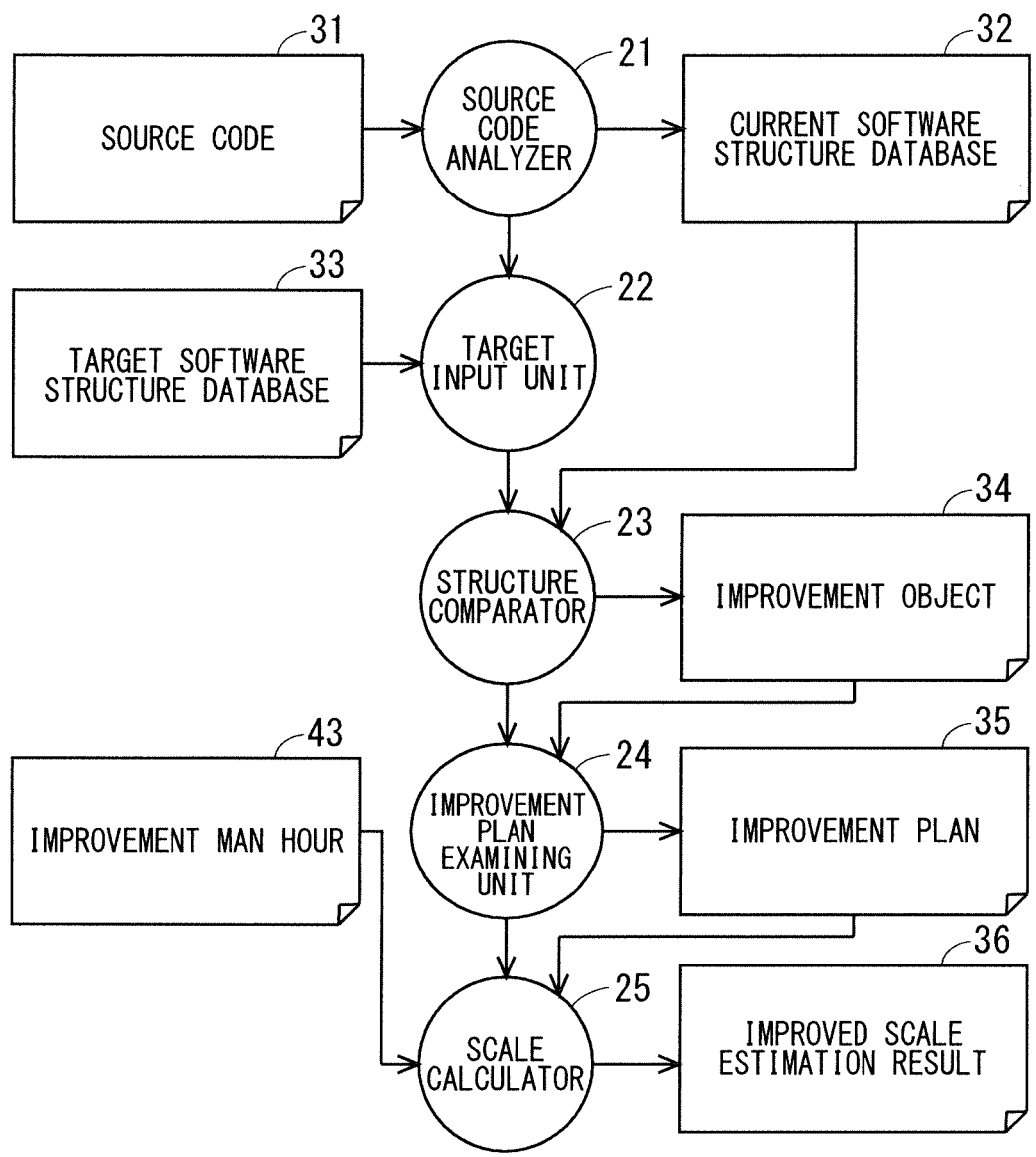
FIG. 23 conceptually illustrates an example configuration of an improvement proposing device according to an embodiment.

FIG. 23 conceptually illustrates an example configuration of the improvement proposing device according to Embodiment 8. As illustrated in the example of FIG. 23, the improvement proposing device includes the source code analyzer 21, the target input unit 22, the structure comparator 23, the improvement plan examining unit 24, and the scale calculator 25.

The input of the target input unit 22 is connected to the output of the source code analyzer 21. The input of the structure comparator 23 is connected to the output of the target input unit 22.

The input of the improvement plan examining unit 24 is connected to the output of the structure comparator 23. The input of the scale calculator 25 is connected to the output of the improvement plan examining unit 24.

The scale calculator 25 receives the improvement plan 35 and an improvement man hour 43 as input. The improvement man hour 43 is an operating time for refactoring.

Figure 24:
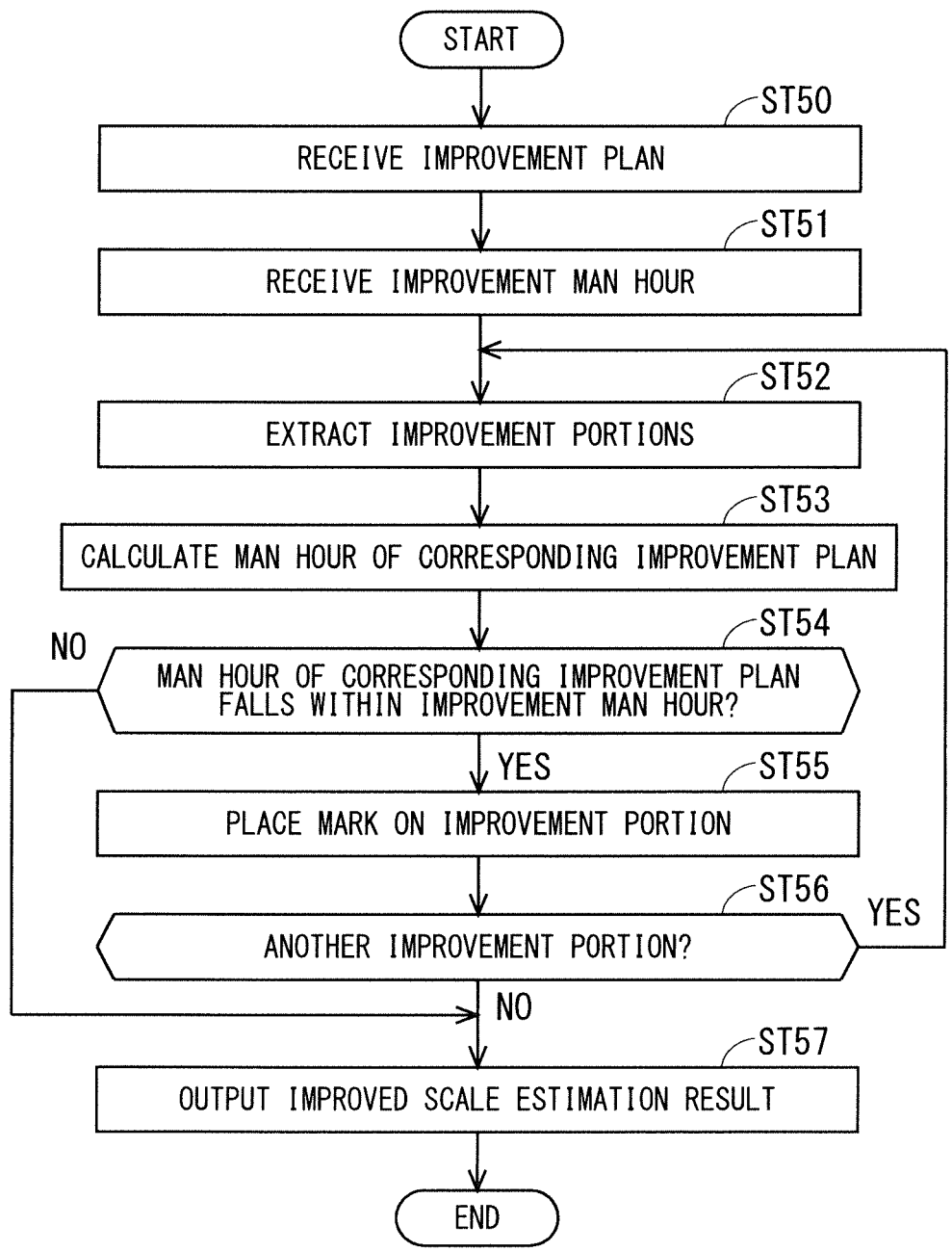
FIG. 24 is a flowchart for outputting an improvement plan in which a man hour to be refactored has been examined.

FIG. 24 is a flowchart for outputting an improvement plan in which a man hour to be refactored has been examined. As illustrated in the example of FIG. 24, the scale calculator 25 first receives the improvement plan 35 (Step ST50).

Next, the scale calculator 25 receives the improvement man hour 43 (Step ST51). Next, the scale calculator 25 extracts improvement portions from the improvement plan 35 (Step ST52). Then, the scale calculator 25 calculates a man hour of an improvement plan corresponding to each of the improvement portions (Step ST53).

Next, the scale calculator 25 determines whether the calculated man hour of the improvement plan falls within the improvement man hour 43 (Step ST54). If the man hour of the improvement plan corresponding to the improvement portion falls within the improvement man hour, that is, if YES branch in Step ST54 in the example of FIG. 24 is taken, the processes proceed to Step ST55. If the man hour of the improvement plan corresponding to the improvement portion does not fall within the improvement man hour, that is, if NO branch in Step ST54 in the example of FIG. 24 is taken, the processes proceed to Step ST57.

Next, the scale calculator 25 places a mark on the improvement portion (Step ST55). Examples of the mark include color, a symbol, an underline, and boldface.

Next, the scale calculator 25 determines whether there is another improvement portion (Step ST56). If there is another improvement portion, that is, if YES branch in Step ST56 in the example of FIG. 24 is taken, the processes return to Step ST52, and the scale calculator 25 extracts another improvement portion from the improvement plan 35. If there is no improvement portion, that is, if NO branch in Step ST56 in the example of FIG. 24 is taken, the processes proceed to Step ST57.

Next, the scale calculator 25 outputs the improved scale estimation result 36 including the man hour of the improvement plan corresponding to each of the improvement portions (Step ST57). Here, the scale calculator 25 places a mark on each of the improvement portions falling within the improvement man hour 43 in the improved scale estimation result 36.

Consequently, calculation of a scale based on the improvement man hour 43 can refactor a man hour corresponding to an operating period acceptable by the operator.

Embodiment 9

An improvement proposing device and an improvement proposing method according to Embodiment 9 will be described. In the following description, the same reference numerals are assigned to the same constituent elements as those in aforementioned Embodiments, and the detailed description will be appropriately omitted.

[Configuration of Improvement Proposing Device]

Embodiment 8 exemplifies calculation of an improved scale estimation within an acceptable range based on an improvement man hour. When a plurality of improvements are expected, not only estimation of a single improvement but also indication of an improvement range in each of the improvements can produce a long-term improvement.

Figure 25:
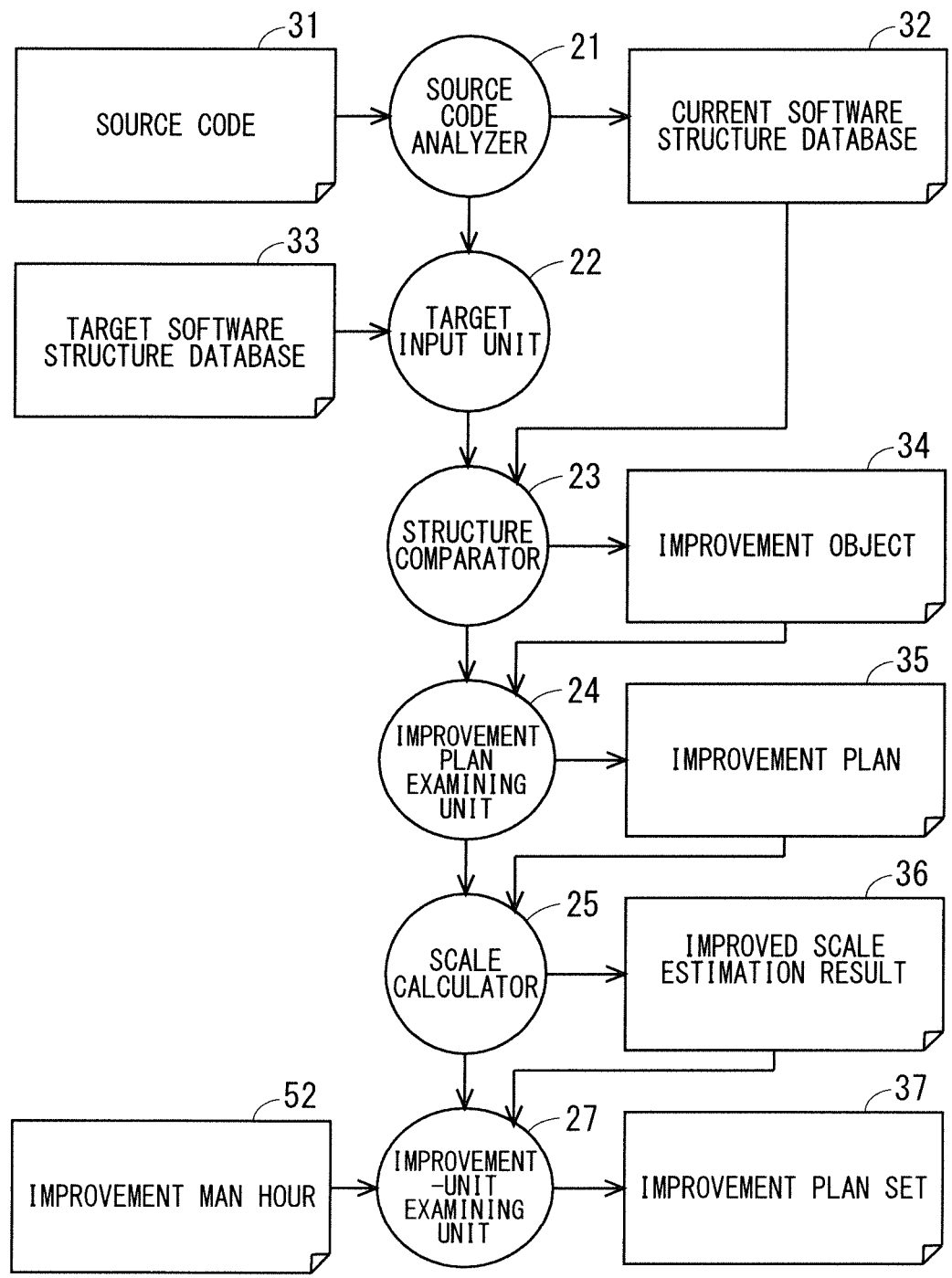
FIG. 25 conceptually illustrates an example configuration of an improvement proposing device according to an embodiment.

FIG. 25 conceptually illustrates an example configuration of the improvement proposing device according to Embodiment 9. As illustrated in the example of FIG. 25, the improvement proposing device includes the source code analyzer 21, the target input unit 22, the structure comparator 23, the improvement plan examining unit 24, the scale calculator 25, and an improvement-unit examining unit 27.

Figure 26:
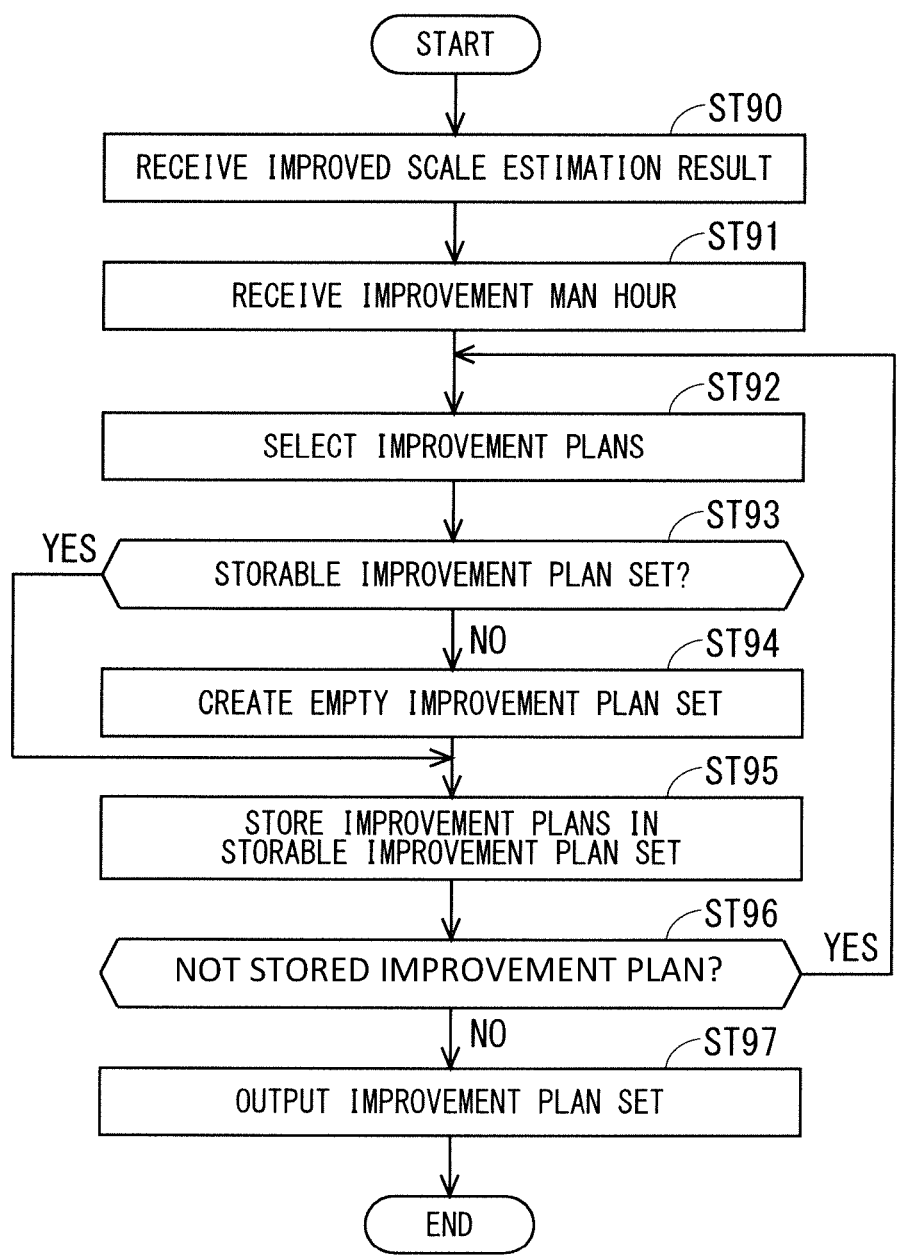
FIG. 26 is a flowchart for outputting an improvement plan set for an improved scale estimation result received by an improvement-unit examining unit.

FIG. 26 is a flowchart for outputting an improvement plan set 37 for the improved scale estimation result 36 received by the improvement-unit examining unit 27.

First, the improvement-unit examining unit 27 receives the improved scale estimation result 36 (Step ST90).

Next, the improvement-unit examining unit 27 receives the improvement man hour 52 (Step ST91).

Next, the improvement-unit examining unit 27 selects improvement plans from the improved scale estimation result 36 (Step ST92). For example, if priorities are assigned to the improvement plans, the improvement-unit examining unit 27 selects the improvement plans in descending order of the priorities.

Next, the improvement-unit examining unit 27 determines whether there is an improvement plan set in which the selected improvement plans can be stored (Step ST93). If there is a storable improvement plan set, that is, if YES branch in Step ST93 in the example of FIG. 26 is taken, the processes proceed to Step ST95. If there is no storable improvement plan set, that is, if NO branch in Step ST93 in the example of FIG. 26 is taken, the processes proceed to Step ST94. The improvement-unit examining unit 27 creates an empty improvement plan set as a memory location of the improvement plans (Step ST94).

Examples of a method for determining whether there is a storable improvement plan set include a method for determining that there is a storable improvement plan set when a sum of a man hour stored in the improvement plan set and a man hour of the selected improvement plans is lower than or equal to a predefined improvement man hour. When the man hour of the improvement plans exceeds the improvement man hour, for example, a step of dividing the improvement plans is added.

Next, the improvement-unit examining unit 27 stores the selected improvement plans in the storable improvement plan set (Step ST95).

Next, the improvement-unit examining unit 27 determines whether there is another improvement plan that is not stored in the improvement plan set (Step ST96). If there is another improvement plan that is not stored in the improvement plan set, that is, if YES branch in Step ST96 in the example of FIG. 26 is taken, the processes return to Step ST92, and the improvement-unit examining unit 27 selects the improvement plan. If there is no improvement plan, that is, if NO branch in Step ST96 in the example of FIG. 26 is taken, the processes proceed to Step ST97.

Next, the improvement-unit examining unit 27 outputs the improvement plan set 37 (Step ST97). Examples of the improvement plan set 37 include a plurality of aligned sets of improvement plans with man hours lower than or equal to the improvement man hour.

Consequently, output of the improvement plan set 37 for the improved scale estimation result 36 received by the improvement-unit examining unit 27 can clarify, when a plurality of improvements are assumed, an improvement range for each of the improvements, and enables refactoring in each of the improvements. Thus, for example, a man hour or a period taken for the whole refactoring can be clarified.

Embodiment 10

An improvement proposing device and an improvement proposing method according to Embodiment 10 will be described. In the following description, the same reference numerals are assigned to the same constituent elements as those in aforementioned Embodiments, and the detailed description will be appropriately omitted.

[Configuration of Improvement Proposing Device]

An error sometimes occurs between an actual man hour (a result man hour) taken for the actual refactoring based on the proposed improvement plan 35 and the improvement man hour 43 estimated in advance (a proposed man hour). Here, feedback of a result of the refactoring can correct the error.

FIG. 27 conceptually illustrates an example configuration of the improvement proposing device according to Embodiment 10. As illustrated in the example of FIG. 27, the improvement proposing device includes the source code analyzer 21, the target input unit 22, the structure comparator 23, the improvement plan examining unit 24, and the scale calculator 25.

The input of the target input unit 22 is connected to the output of the source code analyzer 21. The input of the structure comparator 23 is connected to the output of the target input unit 22.

The input of the improvement plan examining unit 24 is connected to the output of the structure comparator 23. The input of the scale calculator 25 is connected to the output of the improvement plan examining unit 24.

The scale calculator 25 receives the improvement plan 35 and an improved result database 51 as input.

FIG. 28 illustrates an example improved result database. FIG. 28 illustrates an improvement plan of deletion of the arrow extending from B to A whose improvement ID is 1, whose dependency type is referencing a global variable, whose dependency strength is 3, whose proposed man hour (hr) is 30, and whose result man hour (hr) is 25. FIG. 28 also illustrates an improvement plan of deletion of the arrow extending from B to C whose improvement ID is 2, whose dependency type is a function call, whose dependency strength is 2, whose proposed man hour (hr) is 10, and whose result man hour (hr) is 15.

Here, the proposed man hour is an estimated man hour taken for a corresponding improvement plan, whereas the result man hour is a man hour taken for actually exercising the corresponding improvement plan.

Figure 29:
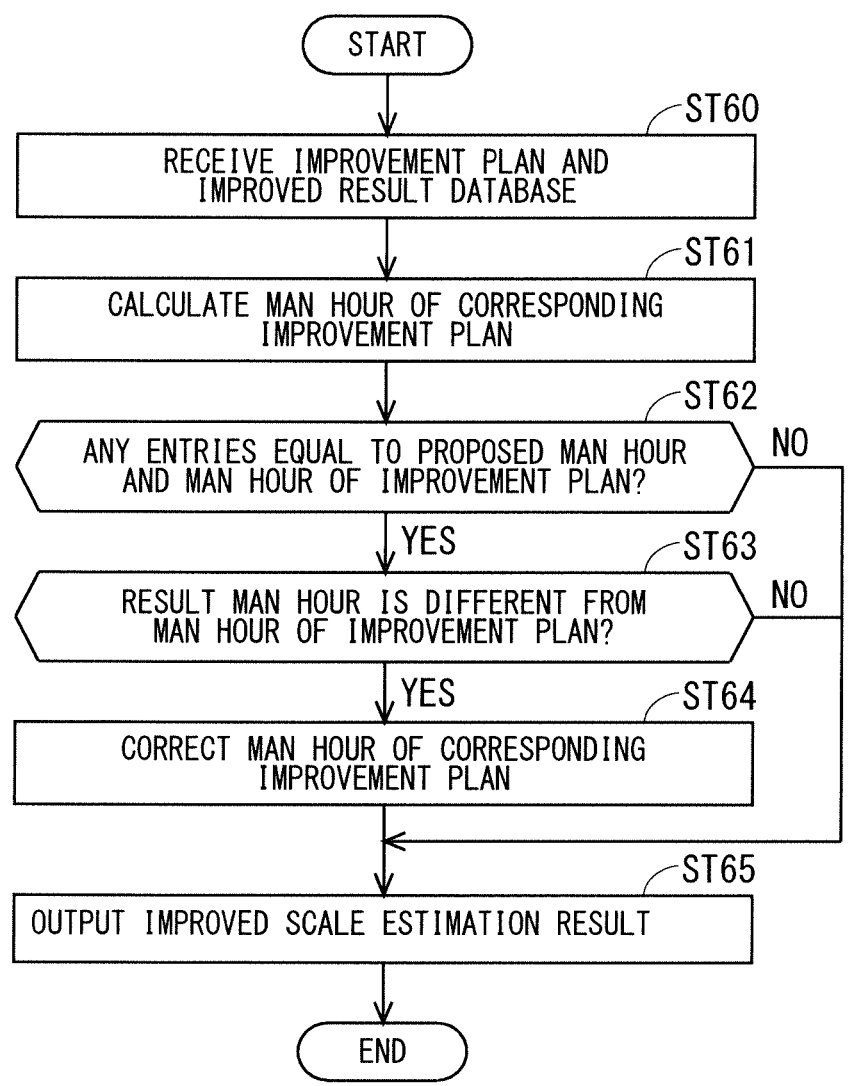
FIG. 29 is a flowchart for outputting an improved scale estimation result in view of the improved result database.

FIG. 29 is a flowchart for outputting an improved scale estimation result in view of the improved result database 51. As illustrated in the example of FIG. 29, the scale calculator 25 first receives the improvement plan 35 and the improved result database 51 (Step ST60).

Then, the scale calculator 25 calculates a man hour of an improvement plan corresponding to an improvement portion, based on the improvement plan 35 (Step ST61).

The man hour is calculated by, for example, multiplying the man hour per dependency type by the number of modules on the dependency strength or an improvement entry. The man hour per dependency type may be set to a predetermined value according to the difficulty of the improvement, or set based on the improved result database 51.

Next, the scale calculator 25 determines whether there are any entries equal to the proposed man hour in the improved result database 51 and the man hour of the improvement plan corresponding to the improvement portion calculated in Step ST61 (Step ST62). If there are any entries equal to the proposed man hour and the man hour of the improvement plan corresponding to the improvement portion, that is, if YES branch in Step ST62 in the example of FIG. 29 is taken, the processes proceed to Step ST63. If there is no entry equal to the proposed man hour or the man hour of the improvement plan corresponding to the improvement portion, that is, if NO branch in Step ST62 in the example of FIG. 29 is taken, the processes proceed to Step ST65.

Next, the scale calculator 25 determines whether the result man hour in the improved result database 51 is different from the man hour of the improvement plan corresponding to the improvement portion calculated in Step ST61 in the entries equal to the proposed man hour and the man hour of the improvement plan corresponding to the improvement portion (Step ST63). If the result man hour is different from the man hour of the improvement plan corresponding to the improvement portion, that is, if YES branch in Step ST63 in the example of FIG. 29 is taken, the processes proceed to Step ST64. If the result man hour is equal to the man hour of the improvement plan corresponding to the improvement portion, that is, if NO branch in Step ST63 in the example of FIG. 29 is taken, the processes proceed to Step ST65.

Next, the scale calculator 25 corrects the man hour of the improvement plan corresponding to the improvement portion calculated in Step ST61 (Step ST64). Here, the scale calculator 25 corrects the man hour calculated in Step ST61 using, for example, a statistic of the result man hours in the improved result database 51, e.g., an average thereof.

Next, the scale calculator 25 outputs the improved scale estimation result 36 including the man hour of the improvement plan corresponding to each of the improvement portions (Step ST65).

Consequently, correction of the estimated man hour based on a result of refactoring can reduce the error.

Embodiment 11

An improvement proposing device and an improvement proposing method according to Embodiment 11 will be described. In the following description, the same reference numerals are assigned to the same constituent elements as those in aforementioned Embodiments, and the detailed description will be appropriately omitted.

[Configuration of Improvement Proposing Device]

In Embodiment 10, an error sometimes occurs depending on the capability of an actual refactoring operator. Thus, inclusion of information on the operator in the input of a result of refactoring can correct an error for each operator.

Figure 30:
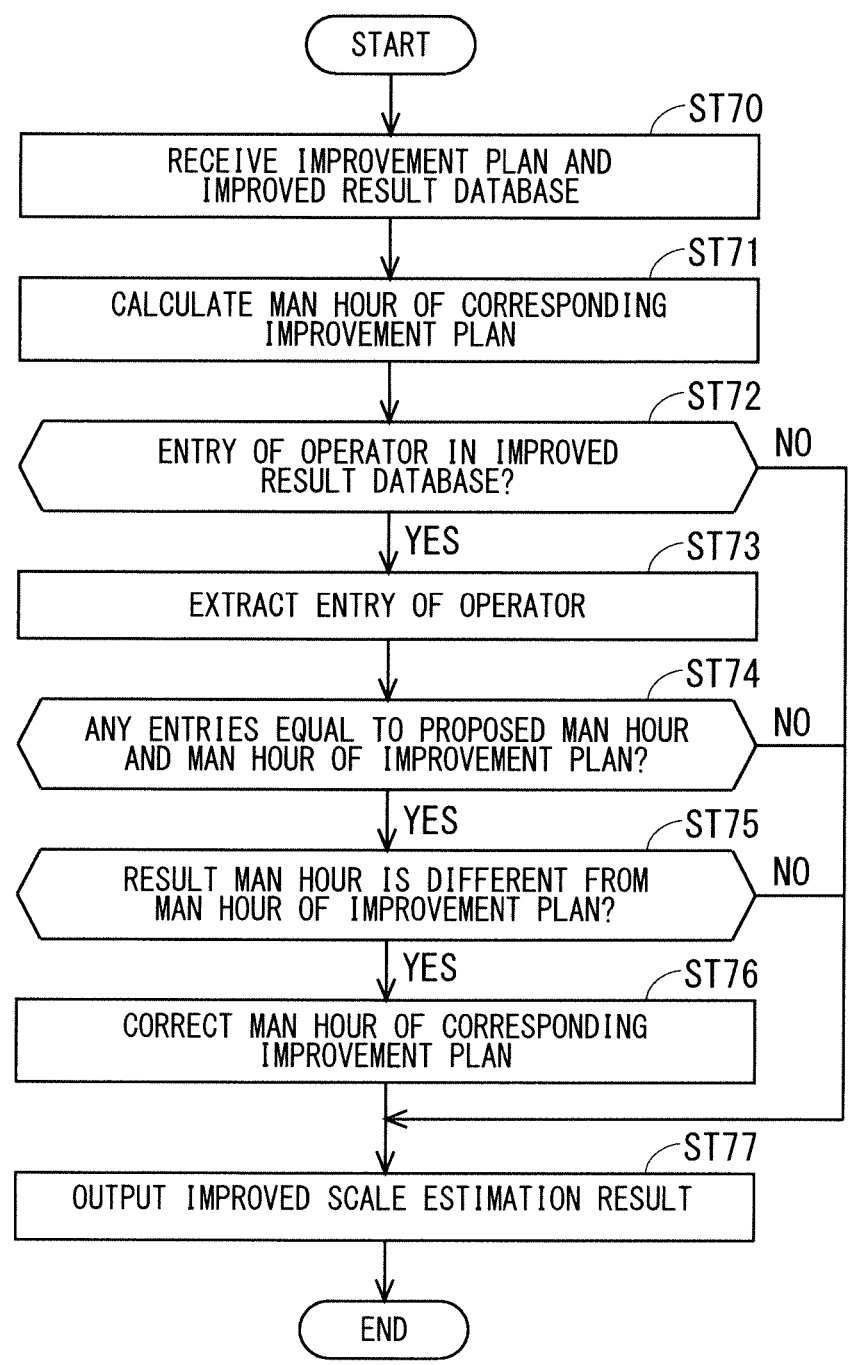
FIG. 30 is a flowchart for outputting an improved scale estimation result in view of an error for each operator.

FIG. 30 is a flowchart for outputting an improved scale estimation result in view of an error for each operator. As illustrated in the example of FIG. 30, the scale calculator 25 first receives the improvement plan 35 and the improved result database 51 (Step ST70).

Then, the scale calculator 25 calculates a man hour of an improvement plan corresponding to an improvement portion, based on the improvement plan 35 (Step ST71).

Next, the scale calculator 25 determines whether there is an entry of an operator in the improved result database 51 (Step ST72). If there is an entry of an operator in the improved result database 51, that is, if YES branch in Step ST72 in the example of FIG. 30 is taken, the processes proceed to Step ST73. If there is no entry of an operator in the improved result database 51, that is, if NO branch in Step ST72 in the example of FIG. 30 is taken, the processes proceed to Step ST77.

Next, the scale calculator 25 extracts the entry of the operator from the improved result database 51 (Step ST73).

Next, the scale calculator 25 determines whether there are any entries equal to the proposed man hour of the operator in the improved result database 51 and the man hour of the improvement plan corresponding to the improvement portion calculated in Step ST71 (Step ST74). If there are any entries equal to the proposed man hour and the man hour of the improvement plan corresponding to the improvement portion, that is, if YES branch in Step ST74 in the example of FIG. 30 is taken, the processes proceed to Step ST75. If there is no entry equal to the proposed man hour or the man hour of the improvement plan corresponding to the improvement portion, that is, if NO branch in Step ST74 in the example of FIG. 30 is taken, the processes proceed to Step ST77.

Next, the scale calculator 25 determines whether the result man hour of the operator in the improved result database 51 is different from the man hour of the improvement plan corresponding to the improvement portion calculated in Step ST71 in the entries equal to the proposed man hour and the man hour of the improvement plan corresponding to the improvement portion (Step ST75). If the result man hour is different from the man hour of the improvement plan corresponding to the improvement portion, that is, if YES branch in Step ST75 in the example of FIG. 30 is taken, the processes proceed to Step ST76. If the result man hour is equal to the man hour of the improvement plan corresponding to the improvement portion, that is, if NO branch in Step ST75 in the example of FIG. 30 is taken, the processes proceed to Step ST77.

Next, the scale calculator 25 corrects the man hour of the improvement plan corresponding to the improvement portion calculated in Step ST71 (Step ST76). Here, the scale calculator 25 corrects the man hour calculated in Step ST71 using, for example, a statistic of the result man hours in the improved result database 51, e.g., an average thereof.

Next, the scale calculator 25 outputs the improved scale estimation result 36 including the man hour of the improvement plan corresponding to each of the improvement portions (Step ST77).

Consequently, correction of the estimated man hour based on the entry of the operator can reduce the error.

[Hardware Configurations of Improvement Proposing Device]

Figure 32:
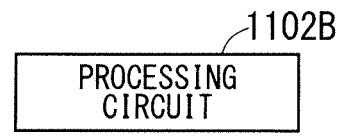
FIG. 32 schematically exemplifies a hardware configuration when the improvement proposing device exemplified in, for example.

FIGS. 31 and 32 schematically exemplify hardware configurations when the improvement proposing device exemplified in, for example, FIG. 1 is actually operated.

The hardware configurations exemplified in FIGS. 31 and 32 do not always coincide in, for example, number with the configuration exemplified in FIG. 1. This is because the configuration exemplified in FIG. 1 illustrates conceptual units.

Thus, at least one of the following cases is conceivable: a case where the one configuration exemplified in FIG. 1 includes a plurality of the hardware configurations exemplified in FIGS. 31 and 32; a case where the one configuration exemplified in FIG. 1 corresponds to a part of the hardware configurations exemplified in FIGS. 31 and 32; and a case where one of the hardware configurations exemplified in FIGS. 31 and 32 includes a plurality of the configurations exemplified in FIG. 1.

FIG. 31 illustrates a processing circuit 1102A that performs computation and a memory 1103 in which information can be stored, as the hardware configurations for implementing the source code analyzer 21, the target input unit 22, the structure comparator 23, the improvement plan examining unit 24, and the scale calculator 25 in FIG. 1. These configurations apply to the other Embodiments.

FIG. 32 illustrates a processing circuit 1102B that performs computation as the hardware configuration for implementing the source code analyzer 21, the target input unit 22, the structure comparator 23, the improvement plan examining unit 24, and the scale calculator 25 in FIG. 1. This configuration applies to the other Embodiments.

Examples of the memory 1103 may include a Hard disk drive (HDD), volatile or non-volatile semiconductor memories such as a random access memory (RAM), a read only memory (ROM), a flash memory, an erasable programmable read-only memory (EPROM), and an electrically erasable programmable read-only memory (EEPROM), memories (recording media) including a magnetic disc, a flexible disk, an optical disk, a compact disk, a mini disk, and a DVD, and any recording media to be used in the future.

The processing circuit 1102A may be the one that executes a program stored in, for example, the memory 1103, an external CD-ROM, an external DVD-ROM, or an external flash memory. Specifically, the processing circuit 1102A may be, for example, a central processing unit (CPU), a microprocessor, a microcomputer, or a digital signal processor (DSP).

When the processing circuit 1102A is the one that executes a program stored in, for example, the memory 1103, an external CD-ROM, an external DVD-ROM, or an external flash memory, the source code analyzer 21, the target input unit 22, the structure comparator 23, the improvement plan examining unit 24, and the scale calculator 25 are implemented by software, firmware, or a combination of software and firmware which causes the processing circuit 1102A to execute the program stored in the memory 1103. The functions of the source code analyzer 21, the target input unit 22, the structure comparator 23, the improvement plan examining unit 24, and the scale calculator 25 may be performed by, for example, coordination of a plurality of processing circuits.

The software and the firmware may be described as programs, and stored in the memory 1103. Here, the processing circuit 1102A performs the functions by reading and executing the programs stored in the memory 1103. Specifically, the program that causes the processing circuit 1102A to consequently perform the functions may be stored in the memory 1103.

Alternatively, the processing circuit 1102B may be dedicated hardware. Specifically, the processing circuit 1102B may be, for example, a single circuit, a composite circuit, a programmed processor, a parallel-programmed processor, an integrated circuit (Application Specific Integrated Circuit (ASIC)), a Field-Programmable Gate Array (FPGA), or a circuit obtained by combining some of these.

When the processing circuit 1102B is dedicated hardware, the source code analyzer 21, the target input unit 22, the structure comparator 23, the improvement plan examining unit 24, and the scale calculator 25 are implemented by operating the processing circuit 1102B. The functions of the source code analyzer 21, the target input unit 22, the structure comparator 23, the improvement plan examining unit 24, and the scale calculator 25 may be performed by separate circuits or a single circuit.

The processing circuit 1102A that executes the program stored in the memory 1103 may perform a part of the functions of the source code analyzer 21, the target input unit 22, the structure comparator 23, the improvement plan examining unit 24, and the scale calculator 25. The processing circuit 1102B that is dedicated hardware may perform another part of the functions.

Advantages Produced by Embodiments Above

Next, example advantages produced by Embodiments above will be described. Although the advantages will be described based on the specific configurations whose examples are shown in Embodiments above, the configurations may be replaced with another specific configuration whose example is shown in this DESCRIPTION as long as it produces the same advantages.

Such replacement may be performed across a plurality of Embodiments. Specifically, such replacement may be performed when combined configurations whose examples are described in different Embodiments produce the same advantages.

According to Embodiments above, the improvement proposing device includes the source code analyzer 21, the target input unit 22, the structure comparator 23, the improvement plan examining unit 24, and a man hour calculator. Here, the man hour calculator corresponds to, for example, the scale calculator 25. The source code analyzer 21 analyzes a first software structure in a source code. Here, the first software structure corresponds to, for example, a current software structure. The target input unit 22 inputs a second software structure different in software structure from the first software structure. Here, the second software structure corresponds to, for example, a target software structure. The structure comparator 33 outputs, as the improvement object 34, a difference between the current software structure and the target software structure. The improvement plan examining unit 24 examines an improvement plan for each improvement portion in the improvement object 34, the improvement plan being a method for bringing the current software structure closer to the target software structure (refactoring the current software structure stepwise according to the improvement plan). The man hour calculator 25 calculates a man hour of the improvement plan for each of the improvement portions.

According to Embodiments above, the improvement proposing device includes the processing circuit 1102A that executes a program, and the memory 1103 in which the program to be executed is stored. The following operations are performed by causing the processing circuit 1102A to execute the program.

Specifically, a current software structure in a source code is analyzed. Then, a difference between the current software structure and a target software structure different in software structure from the current software structure is output as the improvement object 34. Then, an improvement plan that is a method for bringing the current software structure closer to the target software structure (refactoring the current software structure stepwise according to the improvement plan) is examined for each improvement portion in the improvement object 34. Then, the man hour of the improvement plan is calculated for each improvement portion.

According to Embodiments above, the improvement proposing device includes the processing circuit 1102B that is dedicated hardware. The processing circuit 1102B that is dedicated hardware performs the following operations.

Specifically, the processing circuit 1102B that is dedicated hardware analyzes a current software structure in a source code. Then, the processing circuit 1102B outputs, as the improvement object 34, a difference between the current software structure and a target software structure different in software structure from the current software structure. Then, the processing circuit 1102B examines, for each improvement portion in the improvement object 34, an improvement plan that is a method for bringing the current software structure closer to the target software structure (refactoring the current software structure stepwise according to the improvement plan). Then, the processing circuit 1102B calculates a man hour of the improvement plan for each of the improvement portions.

Even when one refactoring operation cannot establish the target software structure, examination of an improvement plan for each improvement portion that is a part of an improvement object that is a difference between the current software structure and the target software structure and calculation of man hours of the respective improvement plans enables selection and refactoring each of the improvement plans according to this configuration. Thus, even when one refactoring operation cannot establish the target software structure, the improvement plans can be refactored stepwise. Furthermore, an increase in options of improvement plans can increase the flexibility of refactoring at the convenience of, for example, a given development period.

When the other configurations whose examples are described in the DESCRIPTION are appropriately added to the configuration above, that is, the other configurations in the DESCRIPTION which are not mentioned as the configuration above are appropriately added, the same advantages can be produced.

According to Embodiments above, the improvement plan examining unit 24 examines a plurality of improvement plans for each of the improvement portions. Then, the man hour calculator 25 calculates a man hour of the plurality of improvement plans for each of the improvement portions. Such a configuration enables refactoring with a high degree of flexibility at the convenience of a refactoring operator.

According to Embodiments above, a range of an improvement object to be prioritized is defined as the improvement range 41, the improvement object to be prioritized being included in at least one improvement object. The improvement plan examining unit 24 examines an improvement plan for each improvement portion in the improvement range 41. Then, the man hour calculator 25 calculates a man hour of the improvement plan for each of the improvement portions in the improvement range 41. Such a configuration enables output of the improvement plans for the improvement portions narrowed down in the improvement range 41. Thus, refactoring with a high degree of flexibility is possible.

According to Embodiments above, the improvement plan examining unit 24 assigns an improvement priority to each of the improvement portions, and examines the improvement plan for each of the improvement portions. Then, the man hour calculator 25 calculates a man hour of the improvement plan for each of the improvement portions, based on the improvement priorities. In such a configuration, assignment of the improvement priorities to the improvement object 34 enables refactoring in view of, for example, the priorities of the improvement portions.

According to Embodiments above, the scale calculator 25 places a mark on a corresponding one of the improvement portions when the calculated man hour of the improvement plan is lower than or equal to a predefined threshold. In such a configuration, calculation of a scale based on the improvement man hour 43 can refactor a man hour corresponding to an operating period acceptable by the operator.

According to Embodiments above, the man hour calculator 25 corrects the calculated man hour of the improvement plan, based on a result man hour of a corresponding one of the improvement portions. In such a configuration, correction of the estimated man hour based on a result of refactoring can reduce an error.

According to Embodiments above, the man hour calculator 25 corrects the calculated man hour of the improvement plan, based on a result man hour of a corresponding one of the improvement portions for each operator. In such a configuration, correction of the estimated man hour based on the entries of the operator can reduce an error.

According to Embodiments above, a current software structure in a source code is analyzed in an improvement proposing method. Then, a difference between the current software structure and a target software structure different in software structure from the current software structure is output as the improvement object 34. Then, an improvement plan that is a method for bringing the current software structure closer to the target software structure (refactoring the current software structure stepwise according to the improvement plan) is examined for each improvement portion in the improvement object 34. Then, the man hour of the improvement plan is calculated for each improvement portion.

Even when one refactoring operation cannot establish the target software structure, examination of an improvement plan for each improvement portion that is a part of an improvement object that is a difference between the current software structure and the target software structure and calculation of man hours of the respective improvement plans enables selection and refactoring each of the improvement plans according to this configuration. Thus, even when one refactoring operation cannot establish the target software structure, the improvement plans can be refactored stepwise.

When there is no particular limitation, the order of processes can be changed.

When the other configurations whose examples are described in the DESCRIPTION are appropriately added to the configuration above, that is, the other configurations in the DESCRIPTION which are not mentioned as the configuration above are appropriately added, the same advantages can be produced.

Modifications of Embodiments Above

Although Embodiments above sometimes specify dimensions, shapes, relative arrangement relationships, and conditions of the constituent elements, these are examples in all aspects, and are not limited to the ones described in the DESCRIPTION.

Therefore, numerous modifications and equivalents that have not yet been exemplified are devised within the scope of the technology disclosed in the DESCRIPTION. Examples of the numerous modifications and equivalents include a case where at least one constituent element is modified, added, or omitted, and further a case where at least one constituent element in at least one embodiment is extracted and combined with a constituent element in another embodiment.

Even when a constituent element is described as one element in Embodiments above, the number of the constituent elements may be more than one unless it is contradictory.

The DESCRIPTION is referred to for all the objectives of the present technology, and is not regarded as prior art.

Furthermore, the constituent elements in Embodiments above are assumed as software or firmware, or hardware corresponding to the software or firmware, and referred to as, for example, parts or circuitry in both of the concepts.

EXPLANATION OF REFERENCE SIGNS 21 source code analyzer, 22 target input unit, 23 structure comparator, 24 improvement plan examining unit, 25 scale calculator, 26 improvement plan degree-of-association calculator, 27 improvement-unit examining unit, 28 implementation plan examining unit, 29 implementation plan dependency analyzer, 31 source code, 32 current software structure database, 33 target software structure database, 34 improvement object, 35 improvement plan, 36 improved scale estimation result, 37 improvement plan set, 38 implementation plan, 39 integrated implementation plan, 41 improvement range, 42 improvement priority, 43, 52 improvement man hour, 51 improved result database, 1102A, 1102B processing circuit, 1103 memory.

The invention claimed is:

1. An improvement proposing device, comprising:
at least one processor to execute a program; and
at least one memory to store the program which, when it is executed by the processor, causes the processor to perform processes comprising:
analyzing a first software structure in a source code;
inputting a second software structure different in software structure from the first software structure;
outputting, as at least one improvement object, a difference between the first software structure and the second software structure;
examining an improvement plan for each improvement portion in the at least one improvement object, the improvement plan being a method for bringing the first software structure closer to the second software structure; and
calculating a man hour of the improvement plan for each of the improvement portions.

2. The improvement proposing device according to claim 1,
wherein the examining includes examining a plurality of improvement plans for each of the improvement portions, the plurality of improvement plans including the improvement plan, and
the calculating includes calculating a man hour of the plurality of improvement plans for each of the improvement portions.

3. The improvement proposing device according to claim 1,
wherein a range of an improvement object to be prioritized is defined as an improvement range, the improvement object to be prioritized being included in the at least one improvement object,
the examining includes examining the improvement plan for each of the improvement portions in the improvement range, and
the calculating includes calculating a man hour of the improvement plan for each of the improvement portions in the improvement range.

4. The improvement proposing device according to claim 1,
wherein the examining includes assigning an improvement priority to each of the improvement portions, and examining the improvement plan for each of the improvement portions, and
the calculating includes calculating a man hour of the improvement plan for each of the improvement portions, based on the improvement priorities.

5. The improvement proposing device according to claim 4,
wherein when executed by the processor, the program further causes the processor to perform a process of assigning the improvement priorities according to a degree of association between the improvement plans, and
the examining includes examining the improvement plans based on the improvement priorities assigned.

6. The improvement proposing device according to claim 1,
wherein the calculating includes placing a mark on a corresponding one of the improvement portions when the calculated man hour of the improvement plan is lower than or equal to a predefined threshold.

7. The improvement proposing device according to claim 1,
wherein when executed by the processor, the program further causes the processor to perform a process of outputting, as an improvement unit, a set of the improvement plans with man hours lower than or equal to a predefined man hour.

8. The improvement proposing device according to claim 1,
wherein the calculating includes correcting the calculated man hour of the improvement plan, based on a result man hour of a corresponding one of the improvement portions.

9. The improvement proposing device according to claim 1,
wherein the calculating includes correcting the calculated man hour of the improvement plan, based on a result man hour of a corresponding one of the improvement portions for each operator.

10. The improvement proposing device according to claim 1,
wherein when executed by the processor, the program further causes the processor to perform a process of outputting at least one implementation plan when the improvement plan is implemented in the source code.

11. The improvement proposing device according to claim 10,
wherein the outputting of at least one implementation plan includes outputting a plurality of implementation plans including the at least one implementation plan,
analyzing dependency between the plurality of implementation plans, and outputting, as an integrated implementation plan, a pair of implementation plans without any contradiction from among the plurality of implementation plans.

12. The improvement proposing device according to claim 1,
wherein the analyzing includes extracting a dependency type and dependency strength between components in the first software structure, and
the calculating includes calculating the man hour of the improvement plan by multiplying a man hour per dependency type by the number of modules on the dependency strength or an improvement entry in each of the improvement portions.

13. The improvement proposing device according to claim 1,
wherein each of the improvement portions corresponds to a part of the at least one improvement object, and corresponds to referencing a variable or a function call in the software structure in the at least one improvement object.

14. An improvement proposing method, comprising:
analyzing a first software structure in a source code;
outputting, as an improvement object, a difference between the first software structure and a second software structure different in software structure from the first software structure; and
examining an improvement plan for each improvement portion in the improvement object, the improvement plan being a method for bringing the first software structure closer to the second software structure; and calculating a man hour of the improvement plan for each of the improvement portions.

15. The improvement proposing method according to claim 14,
wherein the analyzing includes extracting a dependency type and dependency strength between components in the first software structure, and
the calculating includes calculating the man hour of the improvement plan by multiplying a man hour per dependency type by the number of modules on the dependency strength or an improvement entry in each of the improvement portions.

* * * * *